(12) United States Patent
Nakao et al.

(10) Patent No.: US 10,051,989 B2
(45) Date of Patent: Aug. 21, 2018

(54) BEVERAGE EXTRACTION APPARATUS

(75) Inventors: Yoshihiro Nakao, Kawasaki (JP); Yoshiaki Yokoo, Kawasaki (JP); Makoto Nakajima, Kawasaki (JP); Hiroaki Shimizu, Kawasaki (JP); Hiroki Furuta, Kawasaki (JP); Morio Mitsuhashi, Atsugi (JP); Kitaro Oka, Tokyo (JP); Chiseko Sakuma, Inagi (JP)

(73) Assignee: SUNTORY HOLDINGS LIMITED, Osaka-shi, Osaka (JP)

( * ) Notice: Subject to any disclaimer, the term of this patent is extended or adjusted under 35 U.S.C. 154(b) by 1327 days.

(21) Appl. No.: 13/979,885

(22) PCT Filed: Aug. 24, 2011

(86) PCT No.: PCT/JP2011/069050
§ 371 (c)(1),
(2), (4) Date: Dec. 16, 2013

(87) PCT Pub. No.: WO2012/098725
PCT Pub. Date: Jul. 26, 2012

(65) Prior Publication Data
US 2014/0109771 A1    Apr. 24, 2014

(30) Foreign Application Priority Data

Jan. 17, 2011  (JP) ................................. 2011-007382

(51) Int. Cl.
*A47J 31/44* (2006.01)
*A23F 5/26* (2006.01)
(Continued)

(52) U.S. Cl.
CPC ............... *A47J 31/44* (2013.01); *A23F 5/262* (2013.01); *A47J 31/407* (2013.01); *B65D 85/8043* (2013.01)

(58) Field of Classification Search
CPC ..... B65D 85/8043; A47J 31/407; A47J 31/44; A47J 31/057; A23F 5/262
(Continued)

(56) References Cited

U.S. PATENT DOCUMENTS 4,467,707 A * 8/1984 Amiot ................. A47J 31/0621
                                                    251/156
7,565,861 B2 * 7/2009 Blanc .................... A47J 31/053
                                                    426/433
(Continued)

FOREIGN PATENT DOCUMENTS

CN          1738566 A      2/2006
CN         101272718 A     9/2008
(Continued)

OTHER PUBLICATIONS

Supplementary European Search Report dated May 26, 2014 issued in EP Application No. 11856506.8.
(Continued)

*Primary Examiner* — Brian Jennison
(74) *Attorney, Agent, or Firm* — Drinker Biddle & Reath LLP

(57) ABSTRACT

A roasted plant extraction apparatus is provided which is capable of selectively reducing excessive bitterness in an extract liquid obtained by water extraction from a roasted plant raw material while preserving desirable flavor ingredients and body. A beverage extraction apparatus includes a granule containing part containing granules for extraction of a beverage, first pouring device for pouring an extraction solvent into the granule containing part from a first direction, and collecting device for collecting a coffee extract liquid extracted by device of the extraction solvent at the side of layers of the coffee granules corresponding to the first direction. The granule containing part is provided with a
(Continued)

detachable restraining member for placing the granules for extraction of a beverage in a substantially sealed state.

15 Claims, 23 Drawing Sheets

(51) Int. Cl.
*A47J 31/40* (2006.01)
*B65D 85/804* (2006.01)

(58) Field of Classification Search
USPC .......... 99/279, 283, 295, 299, 300; 426/433
See application file for complete search history.

(56) References Cited

U.S. PATENT DOCUMENTS

| 7,644,653 | B2* | 1/2010 | Bates | A47J 31/06 |
| | | | | 99/295 |
| 2001/0042444 | A1 | 11/2001 | Huber et al. | |
| 2006/0144243 | A1 | 7/2006 | Levi et al. | |
| 2007/0245902 | A1 | 10/2007 | Frigeri et al. | |
| 2009/0199722 | A1 | 8/2009 | Bodum | |
| 2011/0100229 | A1* | 5/2011 | Rivera | A47J 31/057 |
| | | | | 99/287 |

FOREIGN PATENT DOCUMENTS

| CN | 201365829 | Y | 12/2009 |
| EP | 1016365 | A1 | 7/2000 |
| JP | H02215414 | A | 8/1990 |
| JP | 4-038919 | | 2/1992 |
| JP | H05-64615 | A | 3/1993 |
| JP | 2578316 | | 11/1994 |
| JP | 2001-017094 | A | 1/2001 |
| JP | 3076826 | U | 4/2001 |
| JP | 2002-291412 | A | 10/2002 |
| JP | 2004016586 | A | 1/2004 |
| JP | 2006167301 | A | 6/2006 |
| JP | 2007-222254 | A | 9/2007 |
| JP | 2007-307357 | A | 11/2007 |
| JP | 4070800 | B1 | 4/2008 |
| JP | 2010-207113 | A | 9/2010 |
| RU | 2007115487 | A | 10/2008 |
| RU | 2380998 | C1 | 2/2010 |
| WO | WO 2007/033016 | A1 | 3/2007 |
| WO | WO 2009/130312 | A1 | 10/2009 |

OTHER PUBLICATIONS

PCT Application PCT/JP2011/069050—International Search Report dated Oct. 11, 2011.

* cited by examiner (1) Barley (2) Soy beans (3) Toasted tea leaf (4) Toasted tea stem (5) Coffee bean

BEVERAGE EXTRACTION APPARATUS

CROSS REFERENCE TO RELATED APPLICATIONS

This application is the National Stage of International Application No. PCT/JP2011/069050, filed Aug. 24, 2011, and claims benefit of Japanese Application No. 2011-007382, filed on Jan. 17, 2011, all of which are herein incorporated by reference in their entirety.

TECHNICAL FIELD

The present invention relates to a beverage extraction apparatus for obtaining an extracted beverage liquid from a roasted plant raw material by water extraction. The present invention relates to an extracted beverage liquid producing apparatus capable of extracting, for example, flavor ingredients in coffee by discriminating the flavor ingredients from bitter ingredients. More particularly, the present invention relates to an extracted beverage liquid producing apparatus so as to be capable of reducing bitter ingredients while being simple in structure by modifying a configuration of an extraction medium supply path.

BACKGROUND ART

As beverages such as coffee, barley water and toasted tea, liquids obtained by roasting plant raw materials to be roasted, such as coffee beans, barley for barley water and tea leaves for toasted tea, and by percolating the roasted materials with hot water or the like are habitually consumed by many people. In a roasting process, a chemical reaction is caused by thermal energy in a plant raw material to be roasted to produce a characteristic flavor or taste, e.g., a flavor, good body, a bitter taste, an acidity or a sweet taste. People have an extremely strong taste for a fragrant flavor produced by roasting in particular.

It is difficult to heat pieces of plant raw material to be roasted so that the pieces of material are uniformly heated to their inner portions, and there is a problem such that a scorched taste is produced in the roasting process or the degree of roasting is reduced to limit the amount of scorching; central portions of the pieces of plant raw material to be roasted are half roasted; and bitterness and various undesirable tastes in the resulting percolated liquid are increased. Even in a case where a strong heating condition is set to reduce the roasting time, only surface portions of the pieces of plant raw material to be roasted are baked and central portions of the pieces of raw material are not sufficiently heated uniformly and the resulting percolated liquid is only bitter and wanting in body.

Methods of reducing a scorched smell and bitterness in an extracted beverage liquid obtained by water extraction from a roasted plant raw material have therefore been proposed. They are, for example, a method of producing a good grain tea beverage having a reduced scorched smell and bitterness resulting from roasting and having a strong sweet taste and a good flavor, including a grain cleaning process for removing scorched portions of roasted grain (Patent Literature 1), a method of removing bitterness by removing fine particles existing in an extract liquid, particularly fine particles having a particle diameter of 5 micrometers or more (Patent Literature 2), and the like. Modifying an extraction apparatus to remove bitterness and various undesirable tastes has also been proposed. For example, an extraction apparatus loaded with activated carbon having an average pore radius distribution about 30 to 100 angstroms and capable of selectively adsorbing and removing a polymeric dark brown ingredient such as chlorogenic acid polymer, which is an astringent ingredient in a coffee extract liquid, by means of the activated carbon has been proposed (Patent Literature 3). Coffee extraction apparatuses capable of improving the clarity of an extract liquid have also been proposed (Patent Literatures 4 and 5).

CITATION LIST

Patent Literature

Patent Literature 1: Japanese Patent Laid-Open No. 2010-207113
Patent Literature 2: Japanese Patent Laid-Open No. 2001-017094
Patent Literature 3: Japanese Patent No. 2578316
Patent Literature 4: Japanese Patent Laid-Open No. 2002-291412
Patent Literature 5: Japanese Utility Model No. 3076826

SUMMARY OF INVENTION

Technical Problem

Reducing bitterness existing as an undesirable ingredient in an extracted liquid (percolated liquid) has conventionally been practiced. However, there is a possibility of failure to sufficiently remove bitterness or a possibility of removing even a rich flavor or taste and body taste specific to a roasted plant simultaneously with removing bitterness, which results in a reduction of the characteristic flavor of a percolated liquid from the roasted plant.

An object of the present invention is to provide a roasted plant extraction apparatus capable of selectively reducing excessive bitterness in an extracted liquid obtained by water extraction from a roasted plant raw material while preserving desirable flavor ingredients and body. For example, the present invention aims to provide a beverage extraction apparatus capable of extracting flavor ingredients in coffee by separating them from excessively strong bitter ingredients.

Solution to Problem

The inventors of the present invention have eagerly made studies to solve the above-described problem and have found that partition walls in a porous structure of a roasted plant formed by a roasting process have a specifically high affinity for excessively strong bitter ingredients, and that excessively strong bitter ingredients existing in an extracted liquid from a roasted plant can be adsorbed and removed in a chromatographic manner by bringing the extract liquid into contact with the roasted plant body held in a stationary state and having exposed partition wall surfaces. More specifically, the inventors have found that excessively strong bitter ingredients can be separated and extracted by a process in which coffee granules are contained in a granule containing part in a state of being placed in a substantially sealed state by means of a restraining member and are maintained in a stationary state, and in which an extraction solvent is passed through the deposited layers of the coffee granules in a reciprocating manner. The inventors have achieved the present invention based on this finding. That is, the present invention relates to the following.

1. A coffee extraction apparatus including a granule containing part containing coffee granules, first pouring device for pouring an extraction solvent into the granule containing part from a first direction, and collecting means for collecting a coffee extract liquid extracted by means of the extraction solvent at the side of layers of the coffee granules corresponding to the first direction, wherein the granule containing part is provided with a detachable restraining member for placing the coffee granules in a substantially sealed state.

2. The coffee extraction apparatus described in 1, further including second pouring device for pouring the extraction solvent into the granule containing part from a second direction opposite to the first direction.

3. The coffee extraction apparatus described in 1 or 2, wherein the granule containing part has such a shape that the coffee granules can be contained therein in a state of being deposited in generally rectangular form as seen in a section along an axial direction.

4. The coffee extraction apparatus described in any one of 1 to 3, wherein the restraining member is a mesh member.

5. The coffee extraction apparatus described in any one of 1 to 4, further including a flow controller for controlling a flow of a liquid flowing in the granule containing part.

6. A beverage extraction apparatus including a granule containing part containing granules for extraction of a beverage, first pouring device for pouring an extraction solvent into the granule containing part from a first direction, and collecting means for collecting an extracted beverage liquid extracted by means of the extraction solvent at the side of layers of the granules corresponding to the first direction, wherein the granule containing part is provided with a detachable restraining member for placing the granules in a substantially sealed state.

7. The beverage extraction apparatus described in 6, further including second pouring device for pouring the extraction solvent into the granule containing part from a second direction opposite to the first direction.

8. The beverage extraction apparatus described in 6 or 7, wherein the granule containing part has such a shape that the beverage granules can be contained therein in a state of being deposited in generally rectangular form as seen in a section along an axial direction.

9. The beverage extraction apparatus described in any one of 6 to 8, wherein the restraining member is a mesh member.

10. The beverage extraction apparatus described in any one of 6 to 9, further including a flow controller for controlling a flow of a liquid flowing in the granule containing part.

11. The beverage extraction apparatus described in any one of 6 to 10, wherein the pouring device includes a pump for injecting the extraction solvent into the granule containing part.

12. The beverage extraction apparatus described in any one of 6 to 11, wherein the collecting means includes a pump for forcibly discharging the extract liquid from the granule containing part.

13. The beverage extraction apparatus described in any one of 6 to 12, wherein one lower opening is formed in a bottom portion of the granule containing part, and a supply channel in the pouring device and a liquid feed channel in the collecting means are connected to the lower opening through a channel switching valve.

14. The beverage extraction apparatus described in any one of 1 to 12, wherein two lower openings are formed in a bottom portion of the granule containing part, a supply channel in the pouring device is connected to one of the lower openings, and a liquid feed channel in the collecting means is connected to the other of the lower openings.

15. The beverage extraction apparatus described in any one of 7 to 13, wherein the second pouring device is connected to a side wall of the granule containing part at a position higher than an upper surface of the granules.

16. The beverage extraction apparatus described in any one of 6 to 15, wherein a disperser for dispersing the extraction solvent over the entire granules is provided above the granules.

17. The beverage extraction apparatus described in any one of 6 to 16, wherein the pouring device is connected to an upper portion of the granule containing part, and at least a portion between the pouring device and the granule containing part is formed of a sloped surface or a curved surface.

18. The beverage extraction apparatus described in any one of 6 to 16, wherein the pouring device is connected to an upper portion of the granule containing part, and an pouring end for dispersing the extraction solvent over a wide area in the granule containing part is provided in the pouring device.

19. The beverage extraction apparatus described in any one of 7 to 15, wherein the granule containing part is separated into two extraction chambers along a left-right direction by the coffee granules; a first supply channel is connected to one of the extraction chambers; a second supply channel is connected to the other of the extraction chambers; and the collecting means is connected to a lower opening of the one of the extraction chambers.

20. The beverage extraction apparatus described in any one of 7 to 15, wherein a bottom surface of the granule containing part is formed into an inverted-circular-cone shape sloped toward the lower opening.

Advantageous Effects of Invention

By use of the beverage extraction apparatus of the present invention, a roasted plant extract liquid of extremely good flavor in which only excessive bitterness is reduced while the flavor and body taste are maintained can be easily obtained. For example, in a case where the beverage extraction apparatus of the present invention is a coffee extraction apparatus, excessively strong bitter ingredients in coffee can be selectively separated and extracted and a coffee extract liquid of extremely good flavor can be easily obtained.

BRIEF DESCRIPTION OF DRAWINGS

FIG. 15 comprises a diagram showing a disperser for dispersing an extraction solvent.

FIG. 16 comprises a diagram showing a granule containing part with a characteristic lid member.

FIG. 20 comprises a sectional view showing a granule containing part having an improved bottom surface shape.

FIG. 21 comprises a diagram showing a granule containing part having an improved bottom surface shape.

FIG. 24 comprises a sectional view showing a beverage extraction apparatus using a coffee granule tube capable of moving along a top-bottom direction.

DESCRIPTION OF EMBODIMENTS

Figure 25:
FIG. 25 shows scanning electron microscopic photograph (SEM) images of a grain (barley), a bean (soy bean), teas (toasted tea leaf, toasted tea stem) and a seed (coffee bean).
Figure 25:
Figure 25:
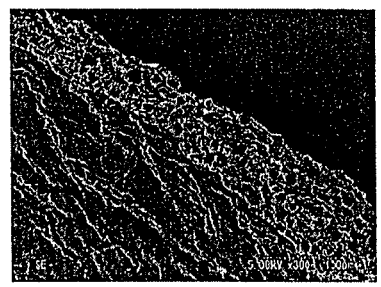
Figure 25:
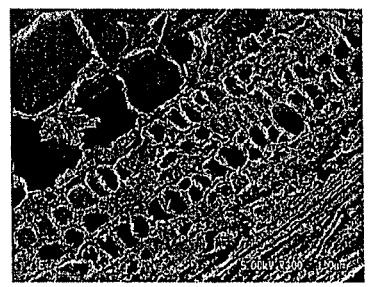
Figure 25:
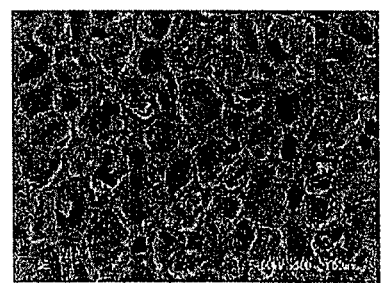

A roasted plant referred to in the description of the present invention is a plant having its water content removed by a roasting process and having its internal cell tissues voided thereby to have a porous structure. Plants that may be used according to the present invention are not limited to particular kinds, as long as they are roasted to have a porous structure. More specifically, examples of such plants are grains, such as barley, wheat, rye, oats (*Avena tatua, Avena sativa*), rice plants, corn, millets (including Japanese barnyard millet and Chinese millet), buckwheat and adlay; trees, such as oak, a cherry tree, an Amur cork, a maple tree, a horse chestnut tree, a chestnut tree, a Chinese scholar tree (Japanese pagoda tree), a keyaki (zelkoba tree), a hinoki (Japanese cypress), cryptomeria japonica, an umbrella pine (Japanese parasol fir), a bamboo, mizunara (a kind of oak), pine, a hiba arborvitae, bamboo grass, a paulownia, an ume tree (Japanese apricot tree), a peach, a wisteria, a fir, an elm, a ginkgo, a camellia, a willow, a mulberry, a teak, mahogany, a magnolia, a persimmon tree, an apricot, a Chinese quince, a sweet brier, a rose, a loquat, a flowering quince, a fragrant olive, a camphor tree, a yew, an acacia and ukogi (a prickly shrub of the family Araliaceae); teas; beans, such as soy beans, adzuki beans, peas, broad beans and kidney beans; seeds, such as sesame seeds, coffee beans (seeds of a coffee tree) and loquat seeds, and the like, but are not limited to these. Also, portions to be used are not particularly defined. For example, germinated seeds, seeds not yet germinated, seed coats, sprouts, flowers, fruits, stems, leaves, roots and the like can be used. FIG. 25 shows scanning electron microscopic photograph (SEM) images of a grain (barley), a bean (soy bean), teas (toasted tea leaf, toasted tea stem) and a seed (coffee bean). As is apparent from the photographs, the grain, bean, toasted tea stem and coffee bean have porous structures. On the other hand, in the toasted tea leaf, a porous structure appears only in a section. Therefore, the present invention is suitable for extraction from seeds of grain plants, seeds in a fruit such as coffee beans, seeds of bean plants and stems of tea plants in terms of the magnitude of the adsorbing effect of the present invention. Extraction from coffee bean seeds in particular is an example of a preferable mode of the present invention. In the present invention, processing such as pulverization may be performed as long as it is performed within such limits that the porous structure of a roasted plant is not broken. In this specification, a roasted plant or a pulverized pieces of such plant having an average grain size of about 0.1 to 2.0 mm, preferably about 0.5 to 2.0 mm, more preferably about 1.0 to 1.5 mm are expressed as granules for beverage extraction (expressed simply as "granules" in some cases).

It is considered that in each of roasted plants obtained by performing a roasting process on these plants, many ingredients produced during roasting are adsorbed and accumulated in layers in order of production on partition walls in the porous structure formed by roasting, and ingredients of strong bitterness produced at the final stage of roasting in particular are adsorbed to the outermost surfaces of the partition walls. The beverage extraction apparatus of the present invention is a apparatus using a porous structure of a roasted plant as a column (stationary phase) and capable of capturing and separating excessively strong bitter ingredients in a chromatographic manner. That is, the apparatus temporarily desorbs ingredients adsorbed to the partition walls in the porous structure of a roasted plant (e.g., partition walls in the honeycomb structure of coffee granules) by passing an aqueous solvent so that the partition wall surfaces are exposed, and passes, through this, an extract liquid obtained by water extraction from the roasted plant raw material. The apparatus can selectively adsorb and remove excessively strong bitter ingredients in the extracted liquid in this way.

To smoothly and effectively perform this desorption of ingredients on the partition wall surfaces and readsorption of the bitter ingredients without requiring any complicated operation, the apparatus of the present invention employs a method of passing the extraction solvent through the layers of the granules for beverage extraction packed (fixed) in a substantially sealed state so that the extraction solvent reciprocates through the granule layers. When a small amount of the extraction solvent is first brought into contact with the granules (going passage), aroma ingredients, taste ingredients (water-soluble taste component, bitter ingredients) adsorbed to the surface of the porous structure are temporarily desorbed to expose the partition wall surfaces of the porous structure. The extraction solvent containing these desorbed components is brought into contact with the granules having the porous structure surfaces exposed, thereby selectively readsorbing only the bitter ingredients in the extraction solvent. "Reciprocating movement of an extraction solvent" referred to in this specification means that an extraction solvent flow by reciprocating, for example, in the direction of gravity or a horizontal direction through a deposited layers of granules, i.e., the extraction solvent flows in one direction and subsequently flows in the opposite direction. For example, in a case where an extraction solvent introduced to desorb ingredients adsorbed to a porous structure flows in a direction opposite to the direction of gravity through the granule layers, and an obtained extract liquid from roasted bean surfaces flows in the direction of gravity, such a flow of water (extraction solvent) is referred to as "reciprocating movement of an extraction solvent".

To carry out such reciprocating movement of an extraction solvent through deposited granule layers with improved reproducibility without requiring any complicated operation, the apparatus of the present invention is provided with a granule containing part containing coffee granules and having a detachable restraining member for placing coffee granules in a substantially sealed state, first pouring device for pouring an extraction solvent into the granule containing part from a first direction, and collecting means for collecting a coffee extract liquid extracted by means of the extraction solvent at the side of layers of the coffee granules corresponding to the first direction.

The restraining member for placing granules in a substantially sealed state is a component necessary for using, as an adsorbent, a roasted plant (extraction residue) having porous structure partition wall surfaces exposed. As the restraining member, a member capable of holding the extraction residue in a substantially sealed state, e.g., a member in plate-like form (retaining plate) inscribed in an extraction section or a member in sack-like form (retaining sack) can be mentioned (see FIG. 1, FIG. 5). "Substantially sealed" referred to in this specification refers to a state in which granules do not move in the granule containing part at the time of supply of an extraction solvent and/or collecting of an extract liquid.

In the case of drip extraction with the conventional coffee extraction apparatus, coffee granules can float close to the liquid surface and move along the extraction solvent pouring path. In the case of extraction by the immersion method, coffee granules can float close to the liquid surface and can be flowed largely by free convection or agitation. In the apparatus of the present invention, the restraining member is placed in such a position as to be in contact with or close to the uppermost surface of granules for beverage extraction, and in such a position as to be in contact with the lowermost surface of the granules, thereby holding the granules in a substantially sealed state so that the granules do not move at the time of extraction. Stopping the granules from moving enables readsorption of excessively strong bitter ingredients to the exposed partition walls in the porous structure. "A position close to the uppermost surface of granules" herein refers to a position which is spaced apart from the uppermost surface of the deposited layers of the granules for beverage extraction by an amount (gap) by which the granules swell naturally when wetted with the extraction solvent. More specifically, such a position is defined within a region from a position at which the granules are slightly compressed (about 0.9 times the volume of the granules) to a position corresponding to about 2 times (preferably about 1.5 times) the volume of the granules, by taking into consideration the swelling of the granules after bringing into contact with the extraction solvent.

Figure 10:
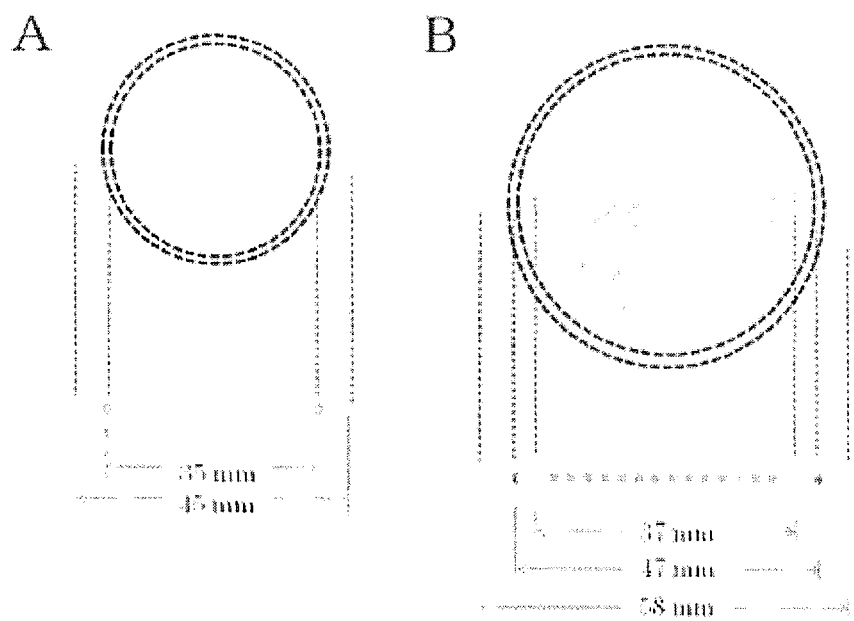
FIG. 10 is a diagram showing a restraining member.

The kind of material for the restraining member and the shape of the restraining member are not particularly limited. More specifically, a mesh member, such as metal mesh, non-woven fabric (flannel, lint or the like) or a paper filter, having a flat shape, a conical shape, a pyramidal shape, a sack-like shape, or the like can be used. If the mesh size of the mesh member is excessively small, clogging occurs easily, the time required for extraction is increased and there is a possibility of over-extraction. It is, therefore, preferable to use a mesh member having a mesh size of about American mesh 20 to 200 if the mesh member is metal mesh. In the case of using a mesh member, a peripheral portion of the mesh member may be formed from an elastic material (e.g., non-woven fabric such as cotton flannel) and the restraining member may be brought into pressure contact with the inner surface of the granule containing part to enhance the restraining function (see FIG. 10).

Figure 1:
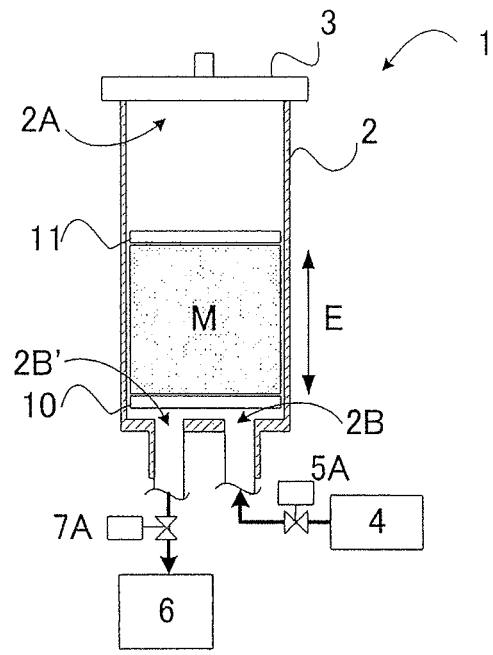
FIG. 1 is a diagram showing a beverage (coffee) extraction apparatus 1.

The present invention will be described in detail with reference to the drawings. However, the present invention is not limited to the contents of the description made below. FIG. 1 shows a beverage extraction apparatus 1 having a cylindrical granule containing part 2. In the beverage extraction apparatus 1 shown in FIG. 1, the "first direction" referred to with respect to the present invention corresponds to a position below the granule containing part 2. The beverage extraction apparatus 1 includes the granule containing part 2 having an upper opening 2A formed at its upper end and a lower opening 2B (pouring port) and a lower opening 2B' (discharging port) formed at its lower end, and having an extraction section E in which granules M for beverage extraction are stored, a lid member 3 detachably attached to the upper opening 2A, an extraction solvent tank 4, a supply channel 5 with a supply valve 5A through which an extraction solvent from the extraction solvent tank 4 is poured into the lower opening 2B of the granule containing part 2, and a liquid feed channel 7 with a liquid feed valve 7A through which an extracted beverage liquid is fed from the lower opening 2B' to a storage tank 6. In the beverage extraction apparatus 1 shown in FIG. 1, the extraction solvent tank 4, the supply channel 5 and the supply valve 5A correspond to the "first pouring device" according to the present invention, and the storage tank 6, the liquid feed channel 7 and the liquid feed valve 7A correspond to the "collecting means" according to the present invention. The extraction section E in the granule containing part 2 includes a lower filter member (also referred to as "first filter member") 10 provided in a position corresponding to the lower end of the granule containing part 2 and a restraining member (also referred to as "second filter member" or "upper filter member") 11 detachably provided in a position above the granules in the lower section such as to be inscribed in the granule containing part 2. The restraining member 11 is set in a position corresponding approximately to the upper surface of the granules M for beverage extraction when the granules M are in a naturally deposited state after being thrown in onto the upper surface of the lower filter member 10, such that the coffee granules M are not caused to flow when the extraction solvent is poured.

It is desirable to make the shape of the granule containing part 2 generally uniform in inside diameter along the direction of onward movement of the coffee extract liquid in order to immobilize the coffee granules M and to facilitate readsorption of bitter ingredients. "The shape generally uniform in inside diameter" means that the sectional shape of deposited layers of the granules M along the axial direction is generally rectangular, that is, the shape is such that the coffee granules can be contained by being deposited in cylindrical or rectangular block form (including cubic form). Also, in a case where the granule containing part 2 has a cylindrical shape such as shown in FIGS. 1 to 4, it is desirable to design the shape of the extraction section E so that, in the generally rectangular sectional shape of the extraction section E along the axial direction, the ratio (H/L) of the width (L) and the height (H) of the rectangle is within a range from 0.1 to 10, preferably from 2 to 6, more preferably from 3 to 6. When the ratio exceeds this range, the time required for extraction may become long and clogging may occur and, hence, over-extraction (a phenomenon in which harsh, pungent and astringent tastes and other various undesirable tastes in the granules are extracted due to excessive contact between the extraction solvent and the granules) may occur. When the ratio is below the above-described range, the sufficiently high adsorption effect expected of the apparatus of the present invention cannot be obtained.

Figure 5:
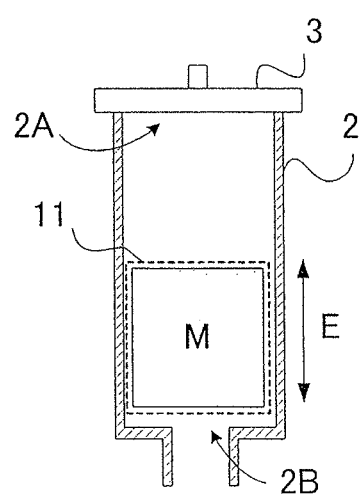
FIG. 5 is diagram showing a case where the entire deposited layers of granules M for beverage extraction are covered with non-woven fabric provided as restraining member, that is, the restraining member is a member in sack form.
Figure 6:
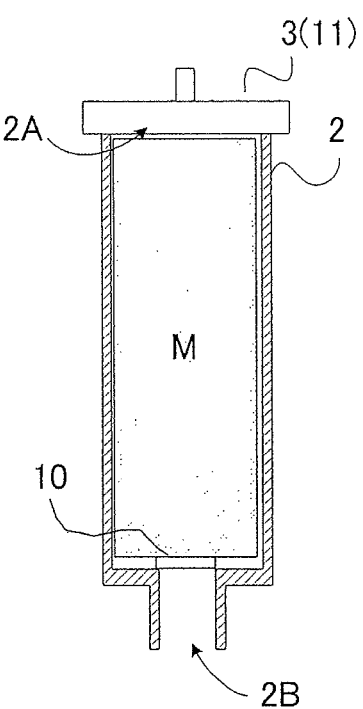
FIG. 6 is a diagram showing an arrangement in which the restraining member 11 is provided in lid member form.

FIG. 1 shows an illustration of a state in which a mesh member of a shape approximately the same as that of the upper surface of the granules M is placed as a retaining plate (restraining member 11). FIG. 5 illustrates a form in which the entire stack of the deposited coffee granules M are covered with non-woven fabric provided as restraining member, i.e., a restraining member in sack form. In this form, there is no distinction between the first filter member and the second filter member, and the restraining member 11 also functions as first filter member. Further, the present invention also includes a restraining member 11 in lid member form such as illustrated in FIG. 6. The restraining member 11 has such a shape as to be inscribed in the granule containing part so that the granules M can be held in a stationary state. The restraining member 11 is mounted in such a position as to be close to or in contact with the granules M.

The first filter member also functions as restraining member. The first filter member is not particularly specified, if the extraction solvent and the extract liquid can pass through the first filter member, and if the first filter member is capable of preventing the coffee granules from falling into and mixing in the coffee extract liquid. More specifically, the first filter member may be, for example, a mesh member such as metal mesh, non-woven fabric (flannel, lint or the like) or a paper filter. If the mesh of the filter member is excessively fine, clogging can occur easily, the time required for extraction is long and there is a possibility of over-extraction. It is, therefore, preferable to use a mesh member having a mesh size of about American mesh 20 to 200 if the mesh member is metal mesh. From the viewpoint of enabling adsorption removal of oil ingredients in the coffee extract liquid, it is preferable to use non-woven fabric.

Figure 2:
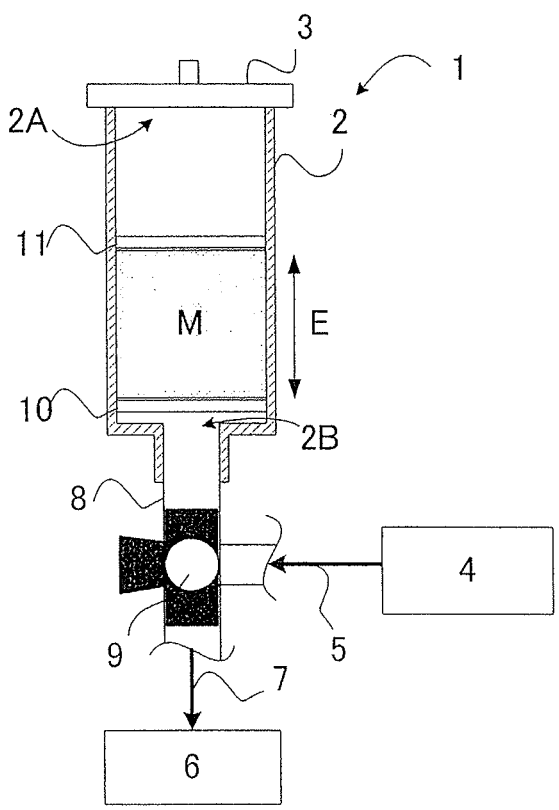
FIG. 2 is a diagram showing a cylindrical beverage extraction apparatus 1 similar to that shown in FIG. 1.

FIG. 2 illustrates a cylindrical coffee extraction apparatus 1 similar to that illustrated in FIG. 1. In the coffee extraction apparatus in FIG. 2, the "first direction" according to the present invention corresponds to a position below the granule containing part 2, as does that in the apparatus illustrated in FIG. 1. The coffee extraction apparatus 1 includes a granule containing part 2 having an upper opening 2A formed at its upper end and a lower opening 2B (serving both as pouring port and as discharging port) formed at its lower end, and having an extraction section E in which coffee granules M are stored, a lid member 3 detachably attached to the upper opening 2A, a conduit channel 8 that communicates with the lower opening 2B of the granule containing part 2, an extraction solvent tank 4, a supply channel 5 through which an extraction solvent from the extraction solvent tank 4 is poured into the lower opening 2B, and a liquid feed channel 7 through which a coffee extract liquid is fed from the lower opening 2B to a storage tank 6. The conduit channel 8 is connected to the supply channel 5 and to the liquid feed channel 7 through a three-way valve 9. In the coffee extraction apparatus 1 shown in FIG. 2, the extraction solvent tank 4, the supply channel 5, the conduit channel 8 and the three-way valve 9 correspond to the "first pouring device" according to the present invention, and the storage tank 6, the liquid feed channel 7, the conduit channel 8 and the three-way valve 9 correspond to the "collecting means" according to the present invention. The extraction section E in the granule containing part 2 includes a lower filter member 10 provided in a position corresponding to the lower end of the granule containing part 2 and a restraining member 11 detachably provided in a position above the granules in the lower section such as to be inscribed in the granule containing part 2, as does that shown in FIG. 1.

Figure 3:
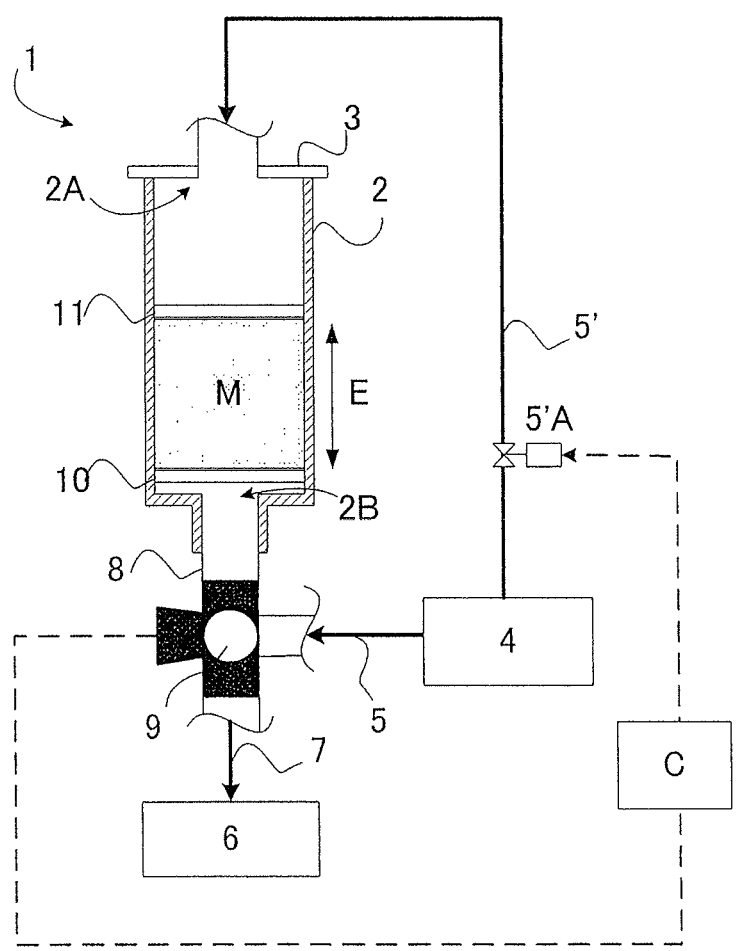
FIG. 3 is a diagram showing a cylindrical beverage extraction apparatus 1 similar to that shown in FIG. 2.

FIG. 3 illustrates a cylindrical coffee extraction apparatus 1 similar to that illustrated in FIG. 2. In the coffee extraction apparatus in FIG. 3, the "first direction" according to the present invention corresponds to a position below the granule containing part 2, and "the direction opposite to the first direction" corresponds to a position above the granule containing part 2. The coffee extraction apparatus 1 includes a granule containing part 2 having an upper opening 2A formed at its upper end and a lower opening 2B (serving both as pouring port and as discharging port) formed at its lower end, and having an extraction section E in which coffee granules M are stored, a lid member 3 detachably attached to the upper opening 2A and having an opening 3A, a supply channel 5' with a supply valve 5A' through which an extraction solvent from an extraction solvent tank 4 is poured into the upper opening 2A via the opening 3A of the lid member 3, a conduit channel 8 that communicates with the lower opening 2B of the granule containing part 2, a supply channel 5 through which the extraction solvent from the extraction solvent tank 4 is poured into the lower opening 2B, and a liquid feed channel 7 through which a coffee extract liquid is fed from the lower opening 2B to a storage tank 6. The conduit channel 8 is connected to the supply channel 5 and to the liquid feed channel 7 through a three-way valve 9. In the coffee extraction apparatus 1 shown in FIG. 3, the extraction solvent tank 4, the supply channel 5, the conduit channel 8 and the three-way valve 9 correspond to the "first pouring device" according to the present invention; the extraction solvent tank 4, the supply channel 5' and the supply valve 5A' correspond to the "second pouring device" according to the present invention; and the storage tank 6, the liquid feed channel 7, the conduit channel 8 and the three-way valve 9 correspond to the "collecting means" according to the present invention. The extraction section E in the granule containing part 2 includes a lower filter member 10 provided in a position corresponding to the lower end of the granule containing part 2 and a restraining member 11 detachably provided in a position above the granules in the lower section such as to be inscribed in the granule containing part 2, as does that shown in FIG. 1.

Figure 4:
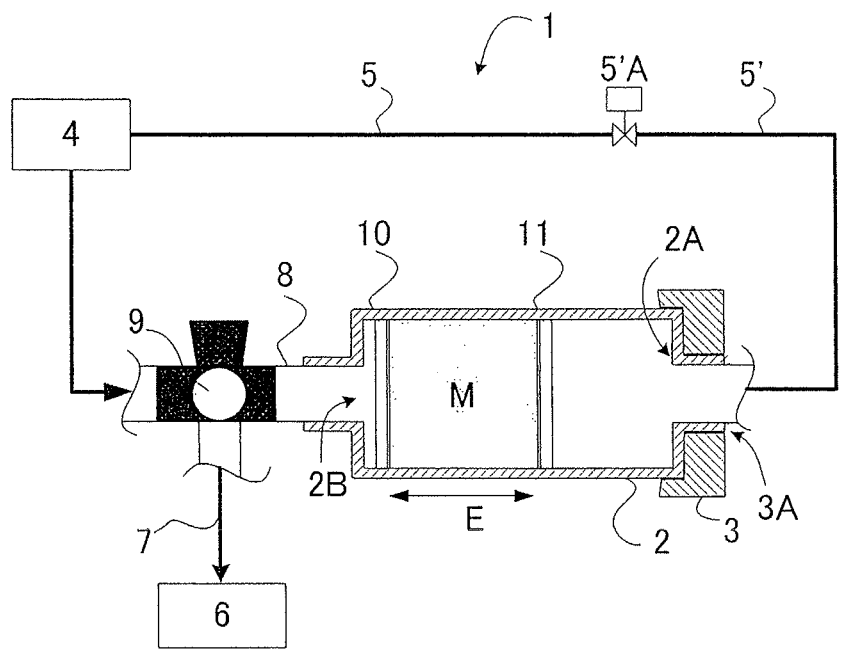
FIG. 4 is a diagram showing a beverage extraction apparatus 1 set so that a granule containing part 2 is in a sideway attitude.

FIG. 4 illustrates a coffee extraction apparatus 1 which is similar to that illustrated in FIG. 3, and which is set so that a granule containing part 2 is in a sideway attitude. In the coffee extraction apparatus in FIG. 4, the "first direction" according to the present invention corresponds to the leftward direction of the granule containing part 2, and "the direction opposite to the first direction" corresponds to the rightward direction of the granule containing part 2. The coffee extraction apparatus 1 includes the granule containing part 2 having a right opening 2A formed at its right end and a left opening 2B (serving both as pouring port and as discharging port) formed at its left end, and having an extraction section E in which coffee granules M are stored, a lid member 3 detachably attached to the right opening 2A and having an opening 3A, a supply channel 5' with a supply valve 5A' through which an extraction solvent from an extraction solvent tank 4 is poured into the right opening 2A via the opening 3A of the lid member 3, a conduit channel 8 that communicates with the left opening 2B of the granule containing part 2, a supply channel 5 through which the extraction solvent from the extraction solvent tank 4 is poured into the left opening 2B, and a liquid feed channel 7 through which a coffee extract liquid is fed from the left opening 2B to a storage tank 6. The conduit channel 8 is connected to the supply channel 5 and to the liquid feed channel 7 through a three-way valve 9. At the left-end opening 2B of the granule containing part 2, a filter member 10 for preventing the coffee granules M from mixing in the coffee extract liquid is detachably attached. In the coffee extraction apparatus 1 shown in FIG. 4, the extraction solvent tank 4, the supply channel 5, the conduit channel 8 and the three-way valve 9 correspond to the "first pouring device" according to the present invention; the extraction solvent tank 4, the supply channel 5' and the supply valve 5A' correspond to the "second pouring device" according to the present invention; and the storage tank 6, the liquid feed channel 7, the conduit channel 8 and the three-way valve 9 correspond to the "collecting means" according to the present invention.

In the apparatus of the present invention, coffee granules M are first set in the extraction section E in a substantially sealed placed state by using the restraining member 11. That is, in the apparatus shown in FIGS. 1 to 3, an operation to throw in coffee granules M onto the upper surface of the lower filter member 10 is performed; the restraining member 11 is set in a position such as to be close to or in contact with the upper surface of the coffee granules M; and the upper opening 2A is closed with the lid member 3. This is a process performed by an operator before activating the apparatus of the present invention.

In the apparatus of the present invention, after placing granules in a substantially sealed state in the granule containing part by using the above-described restraining member, the extraction solvent is poured into the granule containing part from the first direction by the pouring device. The first direction from which the extraction solvent is poured may be a position above or below the granule containing part or a position on the right-hand side or the left-hand side the granule containing part. From the viewpoint of enabling preventing granules M from closing the extraction section E by being compacted, it is preferable to cause an ascending flow of the extraction solvent such that the extraction solvent flows from a position below the extraction section E to a position above the extraction section E. Therefore, a position below the granule containing part can be mentioned as a preferable example of the first direction according to the present invention. Terms such as "above", "below", "upper" and "lower" indicating directions with respect to the granule containing part in this specification denote directions expressed by assuming that the direction of gravity when the apparatus is set corresponds to a position "below", unless otherwise specified. "Upper" designates a portion above a central portion of the granule containing part as seen along the top-bottom direction, and does not necessarily designate only the upper end. Similarly, "lower" designates a portion below a central portion of the granule containing part as seen along the top-bottom direction, and does not necessarily designates only the lower end.

In the apparatuses shown in FIGS. 1 to 3, after the granules M have been placed in a substantially sealed state in the granule containing part 2, the supply valve 5A is operated to be open or the three-way valve 9 is operated to be open on the supply channel 5 side, thereby pouring the necessary amount of the extraction solvent (water, preferably hot water) into the extraction section E and filling the extraction section E until the extraction solvent reaches a level close to the uppermost surface of the deposited layers of coffee granules M. The supply valve 5A and/or the three-way valve 9 may be provided as a manual type or may be provided as an electromagnetic type or the like to enable automatic control with a controller C. Initial pouring of the extraction solvent (first pouring) is for temporarily desorbing ingredients adsorbed to partition walls in the porous structure of a roasted plant (aromatic ingredients and taste ingredients produced mainly at the time of roasting) so that the surfaces of the partition walls in the porous structure are exposed, i.e., preparing for efficiently separating bitter ingredients by using the granules as adsorbent. Therefore, an amount of the extraction solvent sufficient for temporarily desorbing the ingredients adsorbed to the partition walls in the porous structure may suffice in the first pouring. More specifically, an amount of the extraction solvent about 0.3 to 2 times, preferably about 0.5 to 1.5 times the volume of the granules is poured. More preferably, an amount of the extraction solvent is poured such that the extraction solvent can substantially reach the upper surface of the deposited layers of the granules. By using a small amount of extraction solvent in the first pouring, an extract liquid rich in aroma and taste ingredients from the roasted plant surface can be obtained. If an amount of the extraction solvent above the above-described range is poured, there is a possibility of a reduction in the efficiency of separation in the bitter ingredient adsorption step thereafter performed, or extraction of undesirable tastes from inner portions of the roasted plant, which causes degradation in flavor of the extract liquid. The amount of the extraction solvent poured may be controlled by providing a liquid amount meter in the granule containing part 2 and/or the extraction solvent tank 4, and measuring the amount of the extraction solvent poured or flowing out. A liquid level meter may alternatively be provided in the granule containing part 2 to control the amount of the extraction solvent by measuring the level of the liquid surface.

Desorption of ingredients adsorbed to the granules can be effectively performed by passing an amount of the extraction solvent in the above-described range through the granule containing part at a space velocity (SV) of about 3 to 100. The liquid passage rate is set preferably to SV=5 to 70, more preferably to about 5 to 50, further preferably to about 6 to 40. It is preferable to provide a flow controller in the apparatus of the present invention in order to control the flow velocity to a liquid passage rate in this range.

When the extraction solvent is poured into the extraction section, air bubbles enclosed in the granules are released in the extraction section E to exist as air bubbles. These air bubbles may impede pouring of the extraction solvent. It is, therefore, preferable to provide deaeration means in the granule containing part 2 in advance. The deaeration means may be, for example, a device for producing a negative pressure in the granule containing part 2 or a device for applying fine vibrations. A device for applying fine vibrations is especially preferred for maintaining aroma ingredients in the extract liquid as desired.

Before the extraction solvent reaches a level close to the uppermost surface of the deposited layers of coffee granules M, the extract liquid is not taken out; a tranquil state of holding is maintained. When pouring of the predetermined amount of the extraction solvent is completed, the supply valve 5A is operated to be closed and the liquid feed valve 7A is operated to be opened, or the liquid feed valve 7A is operated to be opened while the supply valve 5A is maintained in the open state. Alternatively, the three-way valve 9 is changed so as to be open on the liquid feed channel 7 side to take out the extract liquid from the opening 2B of the granule containing part 2. In the apparatus of the present invention, it is important that the extraction solvent moves in the deposited layers of granules M by reciprocating. Therefore, the extraction solvent is collected as extract liquid at the same side of the layers of granules M as that at which the extraction solvent is poured.

The time required for extraction of the extract liquid by gravity fall is long and over-extraction (a phenomenon in which harsh, pungent and astringent tastes and other various undesirable tastes in the granules are extracted due to excessive contact between the extraction solvent and the granules) may occur. In the case of the apparatuses arranged as shown in FIGS. 1 and 2 without the second pouring device, therefore, it is preferable to provide a dynamic collecting means for smoothly taking out the extract liquid E, e.g., one including drawing means such as a pump in the liquid feed channel 7 or the conduit channel 8 or one for blowing air or the like from a position above the extraction section E of the granule containing part 2 (a position on the side of the extraction section E opposite from the opening 2B) toward the position corresponding to the first direction so that ejection from the opening 2B is urged by the pressure of the air.

In the case of the apparatuses provided with the second pouring device as shown in FIGS. 3 and 4, the extract liquid can be smoothly discharged from the extraction section E by water drive. Also, since the extraction process is performed in these apparatuses with the extraction solvent poured by the second pouring device in a state where excessively strong bitter ingredients in granules M are captured in the porous structure of the granules, these apparatuses can collect a larger amount of the extracted beverage liquid in comparison with those arranged as shown in FIGS. 1 and 2.

In general, as undesirable ingredients in a roasted plant extracted liquid, astringent ingredients that are eluted from inner portions of the granules as the extraction process progresses from the middle stage to the last stage and that stay on the tongue exist as well as excessively strong bitter ingredients (scorched bitters) adsorbed to the partition wall outermost surfaces. In the second pouring in the apparatuses shown in FIGS. 3 and 4, therefore, the extraction is controlled so that such astringent ingredients eluted from the middle stage to the last stage of extraction and staying on the tongue are not collected, thus enabling efficient extraction of an extract liquid with improved flavor. More specifically, it is preferable that the amount of the extract liquid to be taken out by the collecting means is about 0.5 to 5 times, preferably 1 to 3 times, more preferably 1 to 2 times the volume of the granules. If an amount of the extract liquid exceeding 5 times is extracted, an astringent ingredient in the extracted liquid can be perceived. The amount of the extraction solvent in the second pouring may also be controlled with a liquid level meter and/or a liquid amount meter, as is that in the first pouring.

When extraction is performed in this way, the rate of extraction of the extracted liquid is 20% or less, preferably 15% or less. Here, the rate of extraction is a value expressed by the following expression.

$$\text{Coffee extraction rate (\%)} = \{\text{Weight (g) of extract liquid}\} \times \{\text{Brix (\%) of extracted liquid}\} / \{\text{Weight (g) of coffee granules}\}$$

(Brix represents the content of soluble solids measured with a saccharimeter, e.g., Digital Refractometer RX-5000α, manufactured by ATAGO CO., LTD.)

Collecting of the extract liquid is performed while performing adsorption removal of bitter ingredients in the extract liquid obtained by the first extraction. The speed of passage of the extraction solvent through the granule layers, i.e., the speed of discharging of the liquid to be collected, is important in performing adsorption with efficiency. More specifically, the speed of discharging of the liquid to be collected is preferably about 3 to 100, more preferably 5 to 70, further preferably 5 to 50, most preferably 6 to 40 in terms of space velocity (SV).

In the apparatus of the present invention, granules M are set in a state of being placed in a substantially sealed state and the extraction solvent moves through the deposited layers of granules M by reciprocating. It is preferable to provide a flow controller as controller C in order to reliably control the flow of the extraction solvent. The flow controller controls the direction of flow of the extraction solvent and the extract liquid moving in the deposited layers and also controls the flow velocity. More specifically, a pressure control mechanism capable of changing pressure is provided to enable control of the flow of the extraction solvent to the extraction section E.

Also when the extract liquid is taken out, air bubbles existing in the extraction section E may become obstructive. The flow velocity may be controlled by increasing the rate of flow from the second pouring device with the above-described flow controller, and deaeration may be performed by using the deaeration means provided in the above-described granule containing part 2.

Embodiments

Coffee extraction apparatuses in which coffee granules are used as granules for beverage extraction and in which a coffee extract liquid is collected will now be described in detail by way of example with reference to the drawings. However, the present invention is not limited to them. The present invention can be applied to any beverage extraction apparatuses for obtaining an extract liquid for a beverage obtained from a roasted plant as well as to coffee extraction apparatus.

Figure 7:
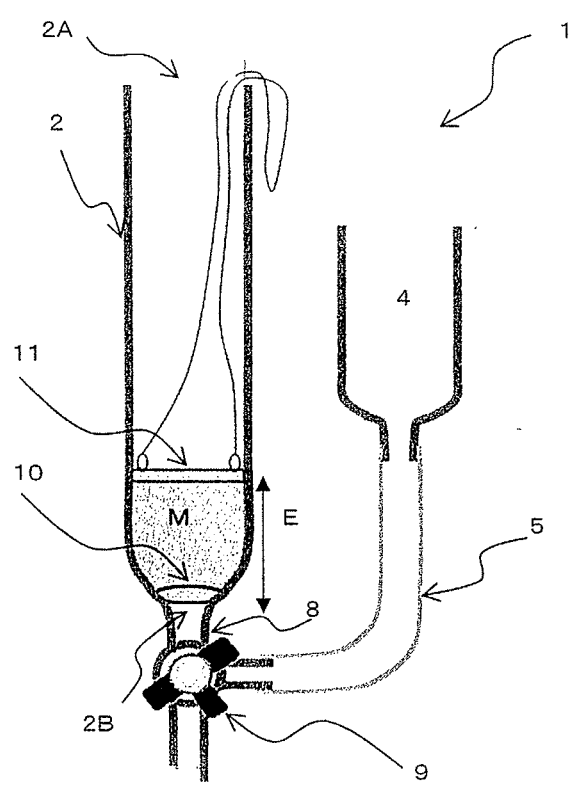
FIG. 7 is a diagram of a beverage extraction apparatus having a granule containing part 2 in a generally cylindrical glass tube having upper and lower openings.
Figure 8:
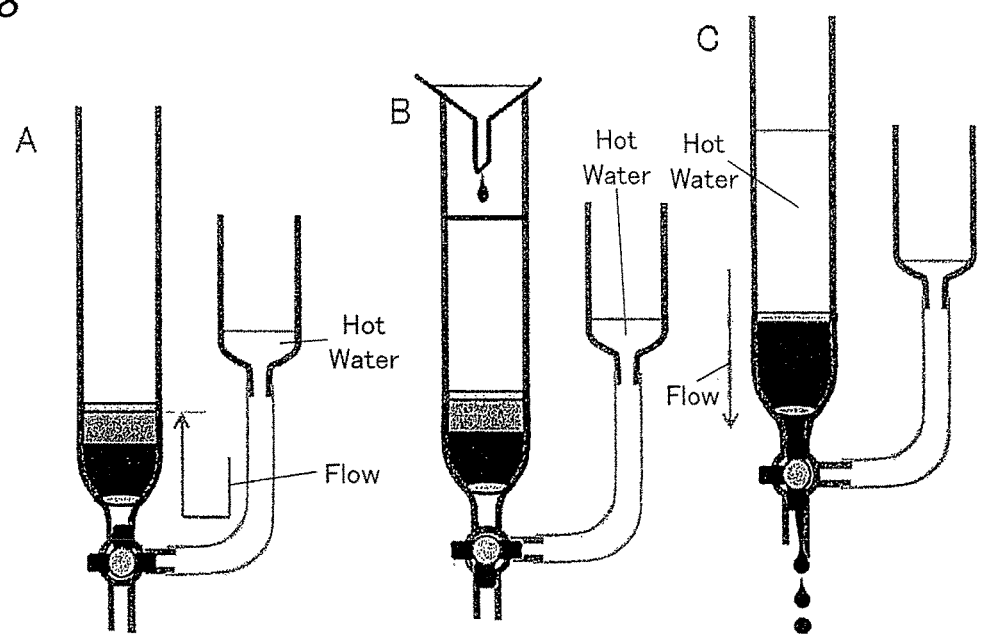
FIG. 8 is a diagram of the beverage extraction apparatus having a granule containing part in a generally cylindrical glass tube having upper and lower openings.

FIGS. 7 and 8 are diagrams showing a table coffee extraction apparatus for serving at home or in other places. Referring to FIG. 7, a granule containing part 2 formed of a generally cylindrical glass tube having upper and lower openings (2A, 2B) is provided. A user first sets a filter (lower filter member) in a bottom portion of the granule containing part 2, puts in coffee granules M on the upper surface of the filter, and places a restraining member for stopping the coffee granules M from flowing in such a position that the restraining member is in contact with or close to the upper surface of the deposition surface. The restraining member may be, for example, a mesh member, such as metal mesh, non-woven fabric (flannel, lint or the like) or a paper filter, having a shape corresponding approximately to the upper surface of the deposition surface. For the purpose of stopping the coffee granules M from flowing, the restraining member is set in such a position as to be inscribed in the granule containing part 2. In particular, it is preferable that a peripheral portion of the mesh member be formed of an elastic material (e.g., cotton flannel or the like) so that the restraining member can be brought into pressure contact with the inner surface of the granule containing part 2 (see FIG. 10).

In the apparatus shown in FIG. 7, an extraction pipe with a three-way cock 9 is formed on the lower opening 2B of the granule containing part 2 and is connected to a hot water container (solvent tank) 4 through a tube. In this apparatus, after the coffee granules M have been placed in a substantially sealed state, hot water is added in the hot water container 4 while the three-way cock 9 is in the closed state; hot water is then poured into the extraction section E by operating the three-way cock 9 (FIG. 8A); the three-way cock 9 is closed when a level close to the uppermost surface of the deposited layers of coffee granules M is reached by hot water in filling; and hot water is poured from the upper opening 2A toward the extraction section E (FIG. 8B). After pouring a suitable amount of hot water from the upper opening, the three-way cock 9 is operated to take out a coffee extract liquid from a collecting port provided at the lower end of the extraction pipe (FIG. 8C). It is preferable to inject, from the second direction (a position above the extraction section E on the opening 2A side, as viewed in FIG. 6), an amount of water suitable for setting the rate of extraction of the coffee extract liquid to be obtained to 20% or less, preferably 15% or less. Here, setting the extraction rate to 20% is for the purpose of avoiding collecting of an astringent taste eluted from the middle stage to the last stage of extraction and staying on the tongue.

Figure 9:
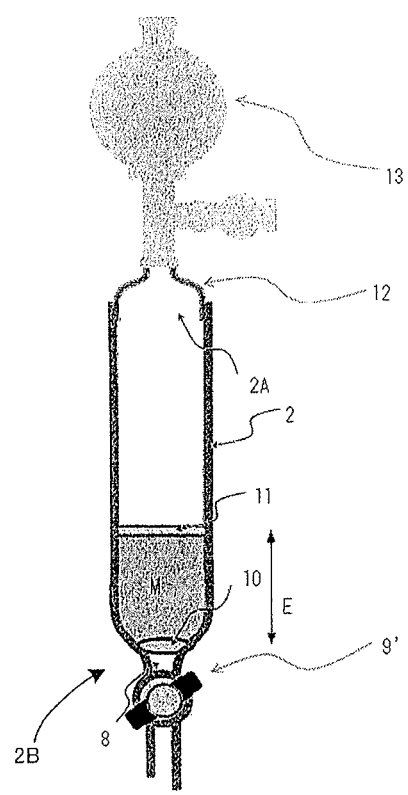
FIG. 9 is a diagram of a beverage extraction apparatus having an extraction pipe with a two-way cock formed on a lower opening 2B of a granule containing part 2.

In a apparatus shown in FIG. 9, an extraction pipe with a two-way cock is formed on a lower opening 2B of a granule containing part 2. After placing coffee granules M in a substantially sealed state, a safety pipetter is attached to an upper opening 2A. A hot water container is set below a collecting port provided at the lower end of the extraction pipe, the collecting port is inserted in hot water contained in the hot water container, and the two-way cock and the safety pipetter are operated to draw up the hot water to a level close to the upper surface of the granules M in the extraction section. Next, the two-way cock is closed; the safety pipetter is removed; hot water is poured from the upper opening 2A of the granule containing part 2 toward the extraction section E; the safety pipetter is again attached; air pressure is applied in the granule containing part 2; and the two-way cock is thereafter opened to collect a coffee extract liquid from the collecting port at the lower end of the extraction pipe.

Figure 11:
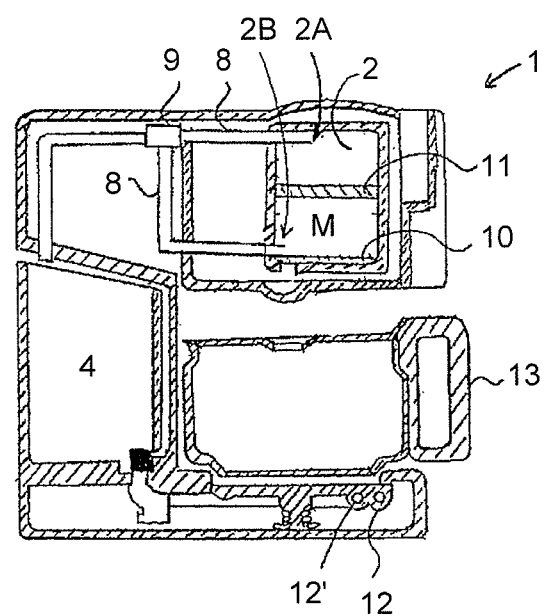
FIG. 11 is a diagram of an electrically powered coffee maker as beverage extraction apparatus.

FIG. 11 shows an example of an electrically powered coffee maker (coffee extraction apparatus 1). In an extraction apparatus 1 main body, a water tank 4 for storing water to be used by a user to extract coffee and a bean storage chamber (granule containing part 2) for setting coffee granules therein by a user are provided. The water stored in the water tank 4 is led to and heated by a heating pipe 12' integral with a heater 12 to become hot water, which passes through a channel change valve 9 and is supplied from a conduit channel 8 to the granule containing part 2. In the apparatus shown in FIG. 11, after a predetermined amount of hot water has been supplied from a lower pouring port 2B to the granule containing part 2, a predetermined amount of hot water is supplied to an upper pouring port 2A, and an extract liquid is accumulated in a storage container 13 and is kept hot with the heater 12.

In this coffee maker, the extraction section E is formed so as to have a preferable shape. That is, it is preferable that a user fills the granule containing part 2 with coffee granules by him/herself so that, in the generally rectangular sectional shape of the granule layers along the axial direction in a case where the granule containing part 2 is cylindrical, the ratio (H/L) of the width (L) and the height (H) of the rectangle is within a range from 0.1 to 10 (preferably from 2 to 6, more preferably from 3 to 6), or a special disposable unit be packed (in which layers of coffee granules M and first and second filter members 10 and 11 are combined integrally with each other). The arrangement may alternatively be such that a hold mechanism for holding a disposable unit at the predetermined position in the granule containing part 2 is provided and the size of a region (extraction section E) in the hold mechanism is designed so as to be within the range as defined above.

Figure 12:
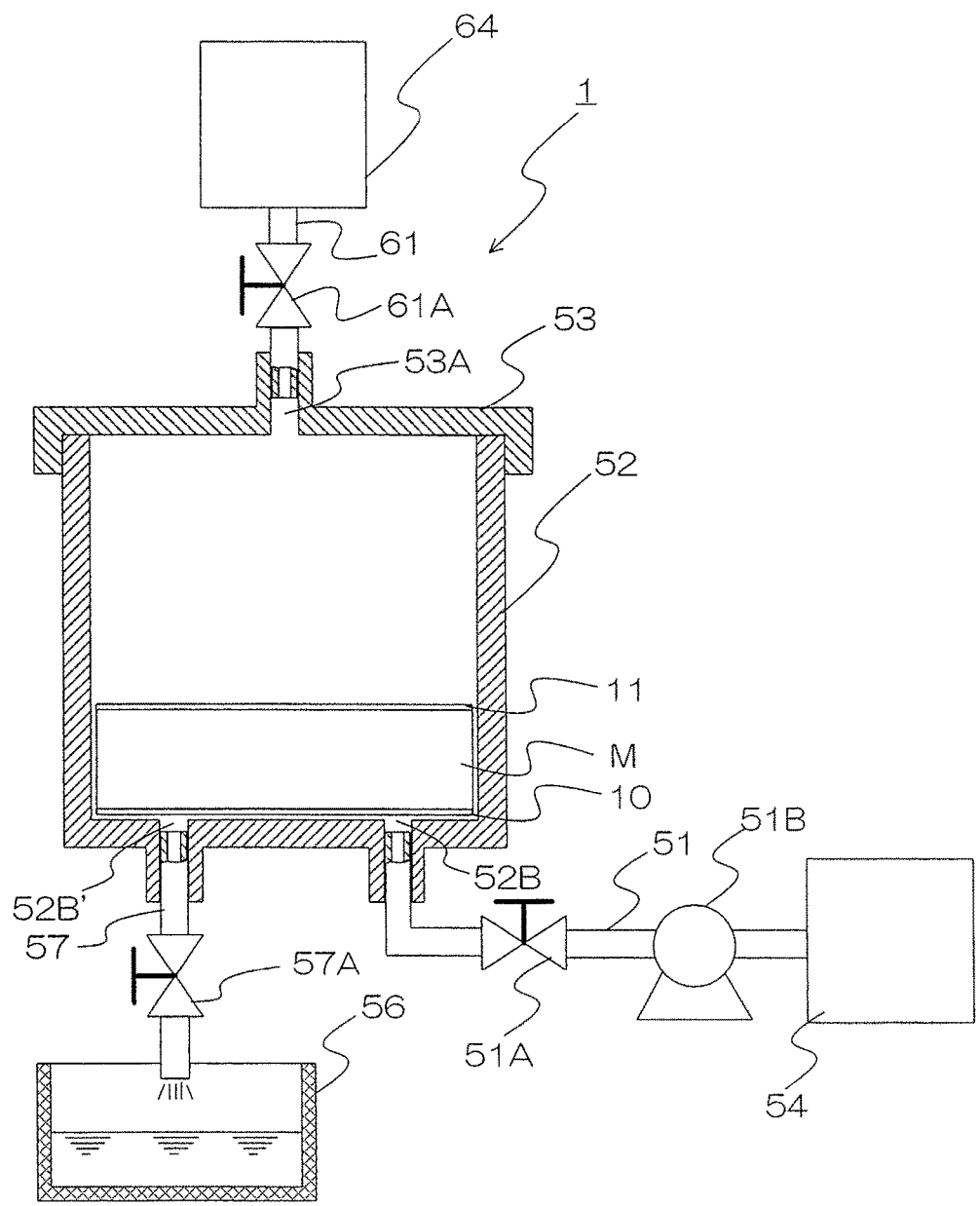
FIG. 12 is a diagram of a beverage extraction apparatus in which first pouring device is connected to a lower portion of a granule containing part, and second pouring device is connected to an upper portion of the granule containing part.

FIG. 12 shows an embodiment of a coffee extraction apparatus 1 provided with two systems of pouring device. That is, first pouring device for pouring an extraction solvent from below a granule containing part 52 and second pouring device for pouring the extraction solvent from above the granule containing part 52 are provided. The first pouring device includes a first supply channel 51, a first supply valve 51A connected in an intermediate portion of the first supply channel 51, and a pump 51B for forcing the extraction solvent into the granule containing part 52. The first supply channel 51 communicates with a first extraction solvent tank 54. The first supply channel 51 is connected to a lower opening 52B of the granule containing part 52. Therefore, supply/shutoff of the extraction solvent from below the granule containing part 52 can be controlled by controlling the first supply valve 51A and the pump 51B. In some cases, if an internal pressure higher than that in the granule containing part 52 is applied in the first extraction solvent tank 54, the pump 51B is not necessary.

The second pouring device is disposed above the granule containing part 52. More specifically, the second pouring device includes a second supply channel 61 connected to an upper opening 53A of a lid member 53, and a second supply valve 61A provided in an intermediate portion of the second supply channel 61. The second supply channel 61 communicates with a second extraction solvent tank 64. Therefore, supply/shutoff of the extraction solvent from above the granule containing part 52 can be controlled by controlling the second supply valve 61A.

In the present embodiment, a discharge opening 52W is provided in a bottom portion of the granule containing part 52. A liquid feed channel 57 is connected to the discharge opening 52B'. Further, a liquid feed valve 57A is provided in an intermediate portion of the liquid feed channel 57. Collecting means is formed by the liquid feed channel 57, the liquid feed valve 57A and, if necessary, other components. The lower end of the liquid feed channel 57 is open toward a storage tank 56. The extract liquid in the granule containing part 52 can be fed into the storage tank 56 by controlling the liquid feed valve 57A. A pump not illustrated may be provided in the liquid feed channel 57 to forcibly discharge an extract liquid from the granule containing part 52.

The operation of the extraction apparatus 1 constructed as described above will be briefly described. First, in a state where coffee granules M are contained in the granule containing part 52, the first supply valve 51A is opened and the pump 51B is started. The extraction solvent (e.g., hot water) is thereby supplied from the first extraction solvent tank 54 to the lower opening 52B of the granule containing part 52 through the first supply channel 51. At this time, the coffee granules M are sandwiched between a restraining member (upper filter member) 11 and a lower filter member 10 respectively located above and below the granules. Therefore, even when the extraction solvent is supplied, the movement of the coffee granules M is limited. Simultaneously with the supply of the extraction solvent, an extract liquid containing extracted coffee ingredients is produced in the granule containing part 52. When the extraction solvent corresponding to the amount of the contained coffee granules M is supplied, the first supply valve 51A is closed.

After a lapse of a predetermined time period, the extraction solvent is poured from the second pouring device. Simultaneously, the liquid feed valve 57A is opened to discharge the extract liquid from the discharge opening 52B'. The extract liquid is smoothly discharged by the water drive effect of the extraction solvent from the second pouring device. The extract liquid is then stored in the storage tank 56 provided below the liquid feed channel 57. At this time, the extract liquid moves in a direction (downward direction) opposite to the direction in which the extraction solvent is supplied by the first pouring device. Therefore, the extract liquid that has been at a position above the coffee granules M again passes through the coffee granules M. As a result, bitter ingredients in coffee are adsorbed to the partition walls of the honeycomb structure of the coffee granules M, as described above. When the supply of the predetermined amount of the extraction solvent from the second pouring device is completed, the second supply valve 61A is closed. Since the coffee granules M have a predetermined thickness, the expression "above the coffee granules M" means being above the lowermost layer of the coffee granules M.

The present embodiment has been described with respect to an example in which two extraction solvent tanks 54 and 64 are provided. However, the present invention is not limited to this example. That is, a single extraction solvent tank may be provided to which the first and second pouring device are connected. The construction of the extraction apparatus 1 can be simplified in this way.

Figure 13:
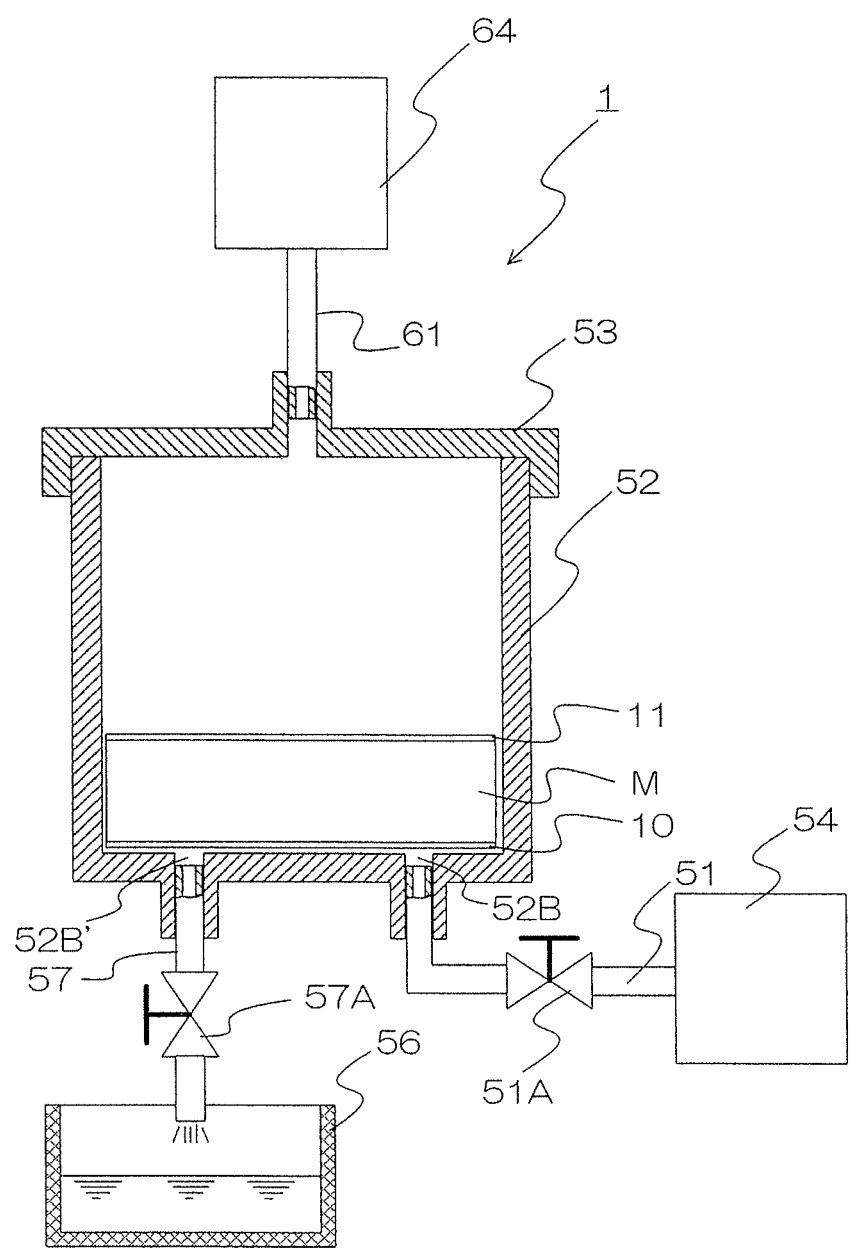
FIG. 13 is a diagram of a beverage extraction apparatus in which first pouring device is connected to a lower portion of a granule containing part, and second pouring device is connected to an upper portion of the granule containing part.

Referring to FIG. 13, most of components shown in FIG. 13 correspond to those in the extraction apparatus disclosed with reference to FIG. 12. A point of difference of the arrangement shown in FIG. 13, however, resides in that the second pouring device is not provided with the second supply valve. That is, it is assumed that an amount of an extraction medium in the second extraction solvent tank 64 required for extraction is calculated in advance, and a construction is designed so that no surplus amount of the extraction solvent is not poured. Therefore, while control of timing of causing the extraction solvent to flow out from the second extraction solvent tank 64 is required, it is not necessary to control the amount of the extraction solvent. As a result, the second supply valve can be removed.

Figure 14:
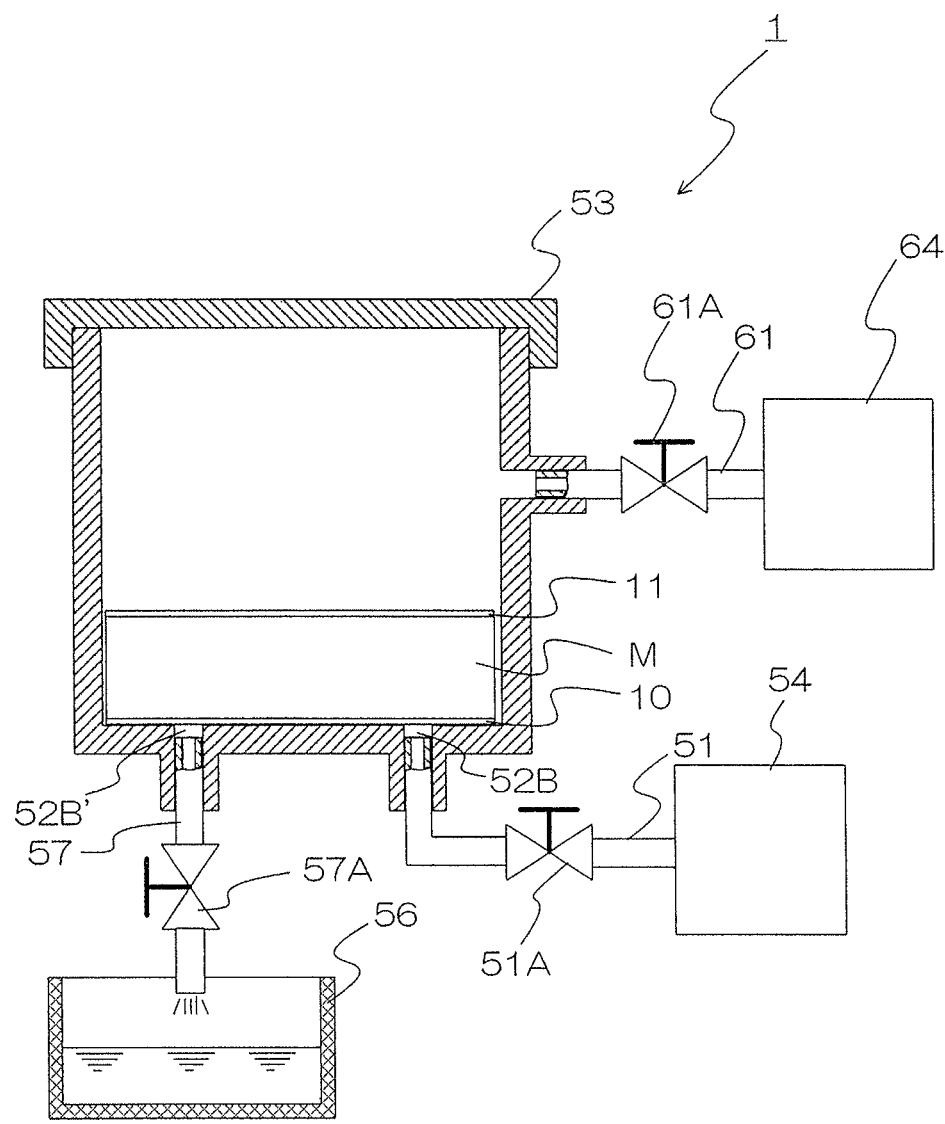
FIG. 14 is a diagram of a beverage extraction apparatus in which first pouring device is connected to a lower portion of a granule containing part, and second pouring device is connected to an upper side wall portion of the granule containing part.

Referring to FIG. 14, most of components shown in FIG. 14 correspond to those in the extraction apparatus disclosed with reference to FIG. 12. A point of difference of the arrangement shown in FIG. 14, however, resides in that the second pouring device is connected to an upper side wall portion of the granule containing part 52. This is for enabling the extract solvent to gently flow in along the surface of the side wall of the granule containing part 52. In this way, disturbance of coffee granules M or the like due to the energy of the motion of the extraction solvent at the time of pouring is suppressed and the stability can be maintained. To achieve an object such as described above, the second supply valve 61A keeps the rate of flow of the extraction solvent equal to or lower than a predetermined value such that the extraction solvent does not separate from the side wall surface of the granule containing part 52.

Figure 15A:
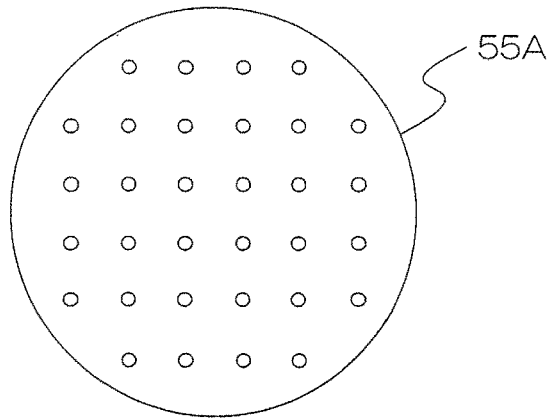
FIG. 15(A) is a plan view of an arrangement in which round holes are dispersed.
Figure 15B:
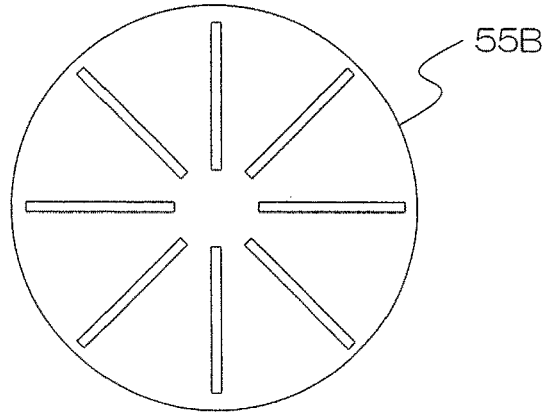
FIG. 15(B) is a plan view of an arrangement in which radial elongated holes are formed.
Figure 15C:
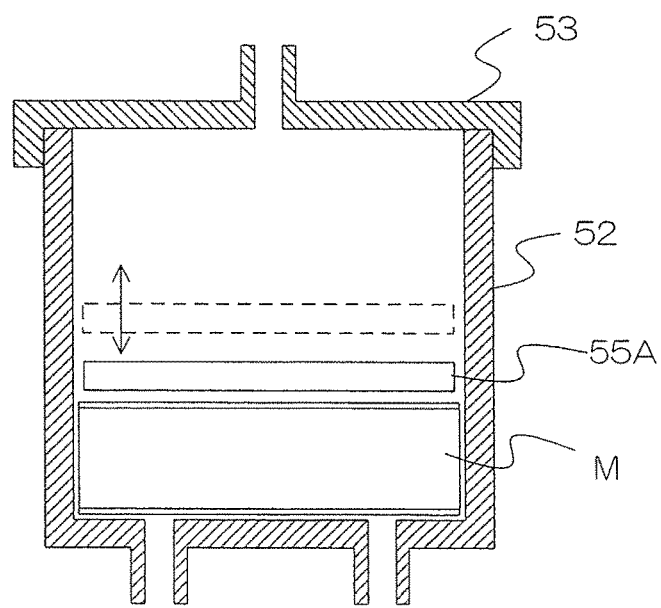
FIG. 15(C) is a sectional view showing an arrangement in which a disperser is disposed in a granule containing part.

From the viewpoint of preventing over-extraction, a dispersion plate having a plurality of openings (see FIG. 15) may be disposed outside the first and second filter members in order to uniformly pass the extraction solvent through the entire layers of granules M in the first pouring and/or the second pouring of the present invention. FIG. 16 shows dispersers 55A and 55B for dispersing the extraction solvent. The disperser 55A has a main body in disk form and a multiplicity of small round holes formed in the main body. The round holes are formed through the main body from the upper surface to the lower surface thereof. FIG. 15(C) shows the disposition of the disperser 55A above coffee granules M for dispersing over a wide area the extraction solvent poured from the lid member 53 side. In the disperser 55A, the round holes are disposed in lattice form. The extraction solvent is supplied to coffee granules M through these round holes. The disperser 55B has radial elongated holes radially formed. Therefore, when the extraction solvent is supplied to a central portion of the disperser 55B, the extraction solvent is supplied to each radial hole so that the extraction solvent is dispersed over the entire coffee granules M. Various cases of positioning of the disperser 55A or 55B in the granule containing part 52 in the height direction are conceivable. For example, the disperser may be positioned so as to be in contact with the upper surface of coffee granules M or may be disposed above the surface of coffee granules M by being spaced apart from the surface. The shape and the number of holes in each of the dispersers 55A and 55B are not limited to those described above. Any holes may suffice if they are capable of uniformly dispersing the extraction solvent. The disperser also has the function of reducing the flow velocity of the extraction solvent, i.e., suppressing the phenomenon in which the extraction solvent with large energy causes granules M to move in a leaping manner. It is, therefore, preferable to limit the size of the holes in the disperser.

Figure 16A:
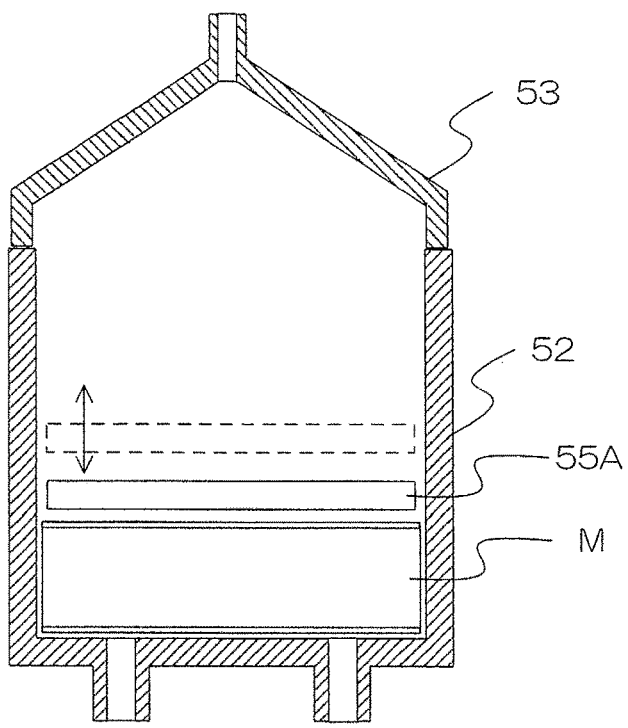
FIG. 16(A) is a sectional view of a lid member in circular cone form.

FIG. 16 comprises a sectional view showing a granule containing part 52 with a lid member 53 having a characteristic shape. Here, FIG. 16(A) shows an example of a lid member 53 having the shape of a circular cone. Pouring device (not illustrated) is connected to a central portion (top) of this lid member 53. The lid member 53 has a sloped surface, such that a circular cone shape is formed from the central portion toward a peripheral portion. The rate of supply of the extraction solvent from the pouring device is such that the extraction solvent is not swiftly poured from the pouring device; the extraction solvent is poured so as to gently reach the side wall of the granule containing part 52 by moving along the sloped surface. Also, in this embodiment, the disperser 55A is disposed to effectively prevent coffee granules M from moving in a leaping manner even when the extraction solvent is swiftly poured.

Figure 16B:
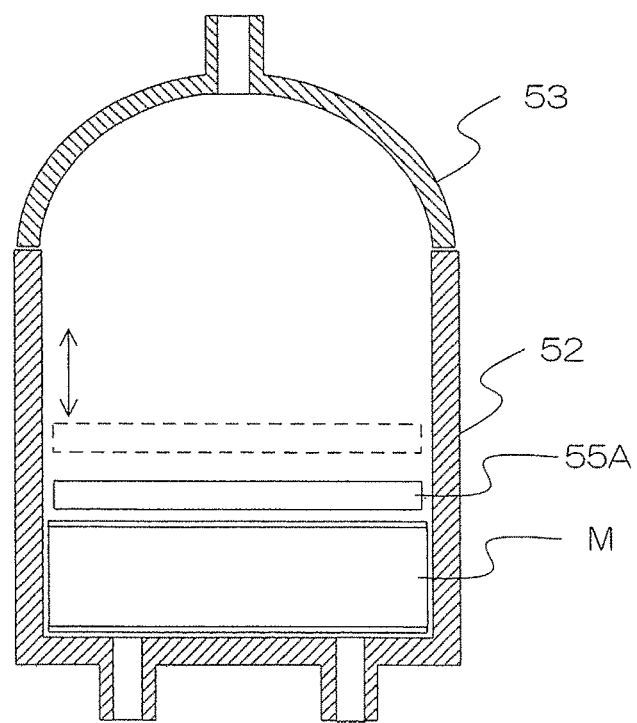
FIG. 16(B) is a sectional view of a lid member in partially spherical form.

FIG. 16(B) shows a case where the shape of a lid member 53 is partially spherical. As illustrated, pouring device is connected to a central portion (top), as in the case shown in FIG. 16(A). In the example shown in FIG. 16(B), however, the extraction solvent poured from the pouring device gently reaches the side wall of the granule containing part 52 by moving along the spherical surface of the partially spherical shape. In particular, no angular portion is formed in the inner surface of the lid member 53 and, therefore, separation of the extraction solvent cannot not occur easily. Thus, the extraction solvent can be poured gently and softly.

Figure 17:
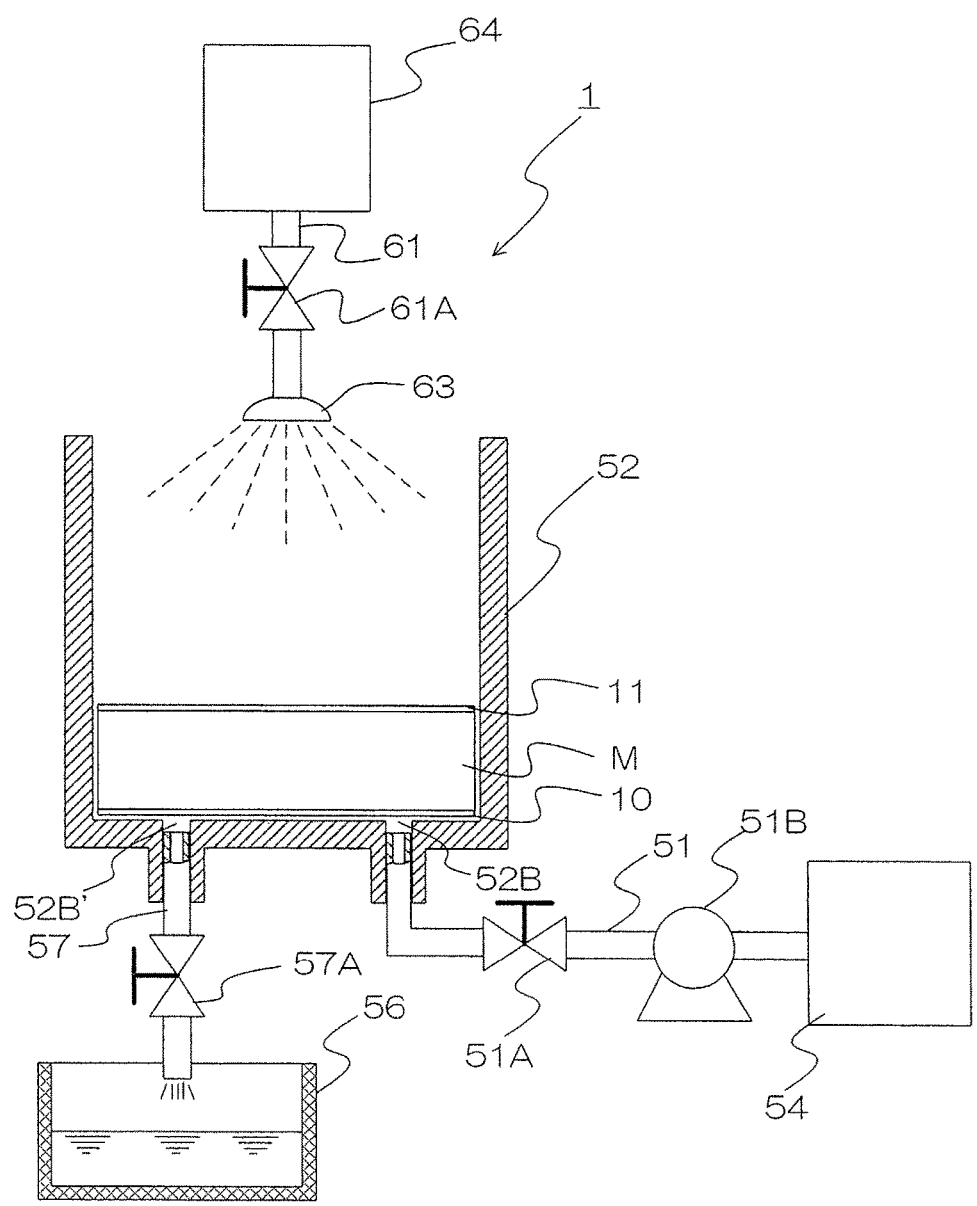
FIG. 17 is a sectional view of a beverage extraction apparatus including second pouring device having an pouring end capable of pouring an extraction solvent in a showering manner.

FIG. 17 shows a coffee extraction apparatus 1 provided with second pouring device including an pouring end 63 capable of supplying an extraction solvent in a showering manner. The pouring end 63 of the second pouring device has a structure similar to that of a shower head such as to be capable of uniformly pouring the extraction solvent into the entire granule containing part 52. In FIG. 17, the structure is seen as if the extraction solvent is poured by gravity. However, the present invention is not limited to this. That is, a multiplicity of fine flows of the extraction solvent may be formed by making the holes of the pouring end 63 smaller and by making connection to a pressurizing pump (not illustrated) or the like. Further, pouring of the extraction solvent in spray form may be enabled by making the holes of the pouring end 63 smaller and by increasing the pressuring power.

Figure 18:
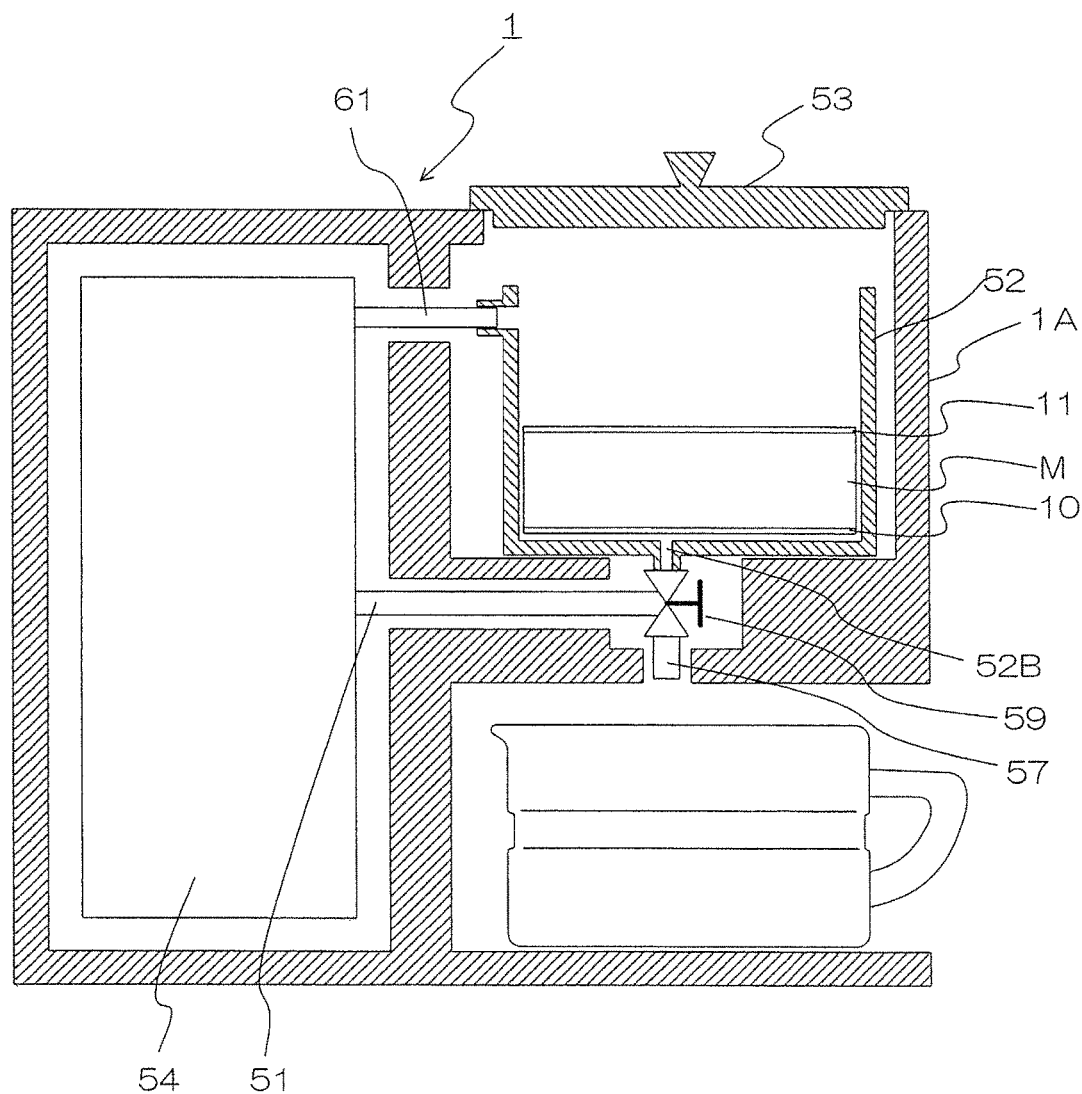
FIG. 18 is a sectional view of a beverage extraction apparatus for home use in which first pouring device is connected to a lower portion of a granule containing part, and second pouring device is connected to an upper side wall portion of the granule containing part.

FIG. 18 is a diagram showing an example of application of the present invention to an electrically powered coffee maker for home use (coffee extraction apparatus) 1. Here, the extraction apparatus 1 is provided with an extraction apparatus main body 1A in which components of the device are housed, an extraction solvent tank 54 housed in the extraction apparatus main body 1A, and a granule containing part 52 connected to the extraction solvent tank 54 through supply channels 51 and 61.

The extraction solvent tank 54 contains an extraction solvent (hot water) therein and is capable of pouring the extraction solvent into the granule containing part 52 from the two supply channels 51 and 61. The supply channels 51 and 61 in the present embodiment are formed of a first supply channel 51 through which the extraction solvent is poured from a lower opening 52B of the granule containing part 52, and a second supply channel 61 through which the extraction solvent is poured from above the granule containing part 52. A channel switching valve 59 is provided between the first supply channel 51 and the lower opening 52B and is capable of switching between pouring of the extraction solvent from the lower opening 52B and discharge of the extract liquid from the lower opening 52B.

The second supply channel 61 is connected to an upper side wall portion of the granule containing part 52 and is capable of softly pouring the extraction solvent along the inner wall surface of the granule containing part 52. Here, a supply valve 61A is not provided in the second supply channel 61. However, a supply valve 61A may be provided at an intermediate position in the second supply channel 61 or may be provided integrally with the extraction solvent tank 54. A liquid feed channel 57 is provided below the channel switching valve 59 and is capable of pouring the extract liquid into a coffee server made of glass, a coffee cup or the like.

Figure 19:
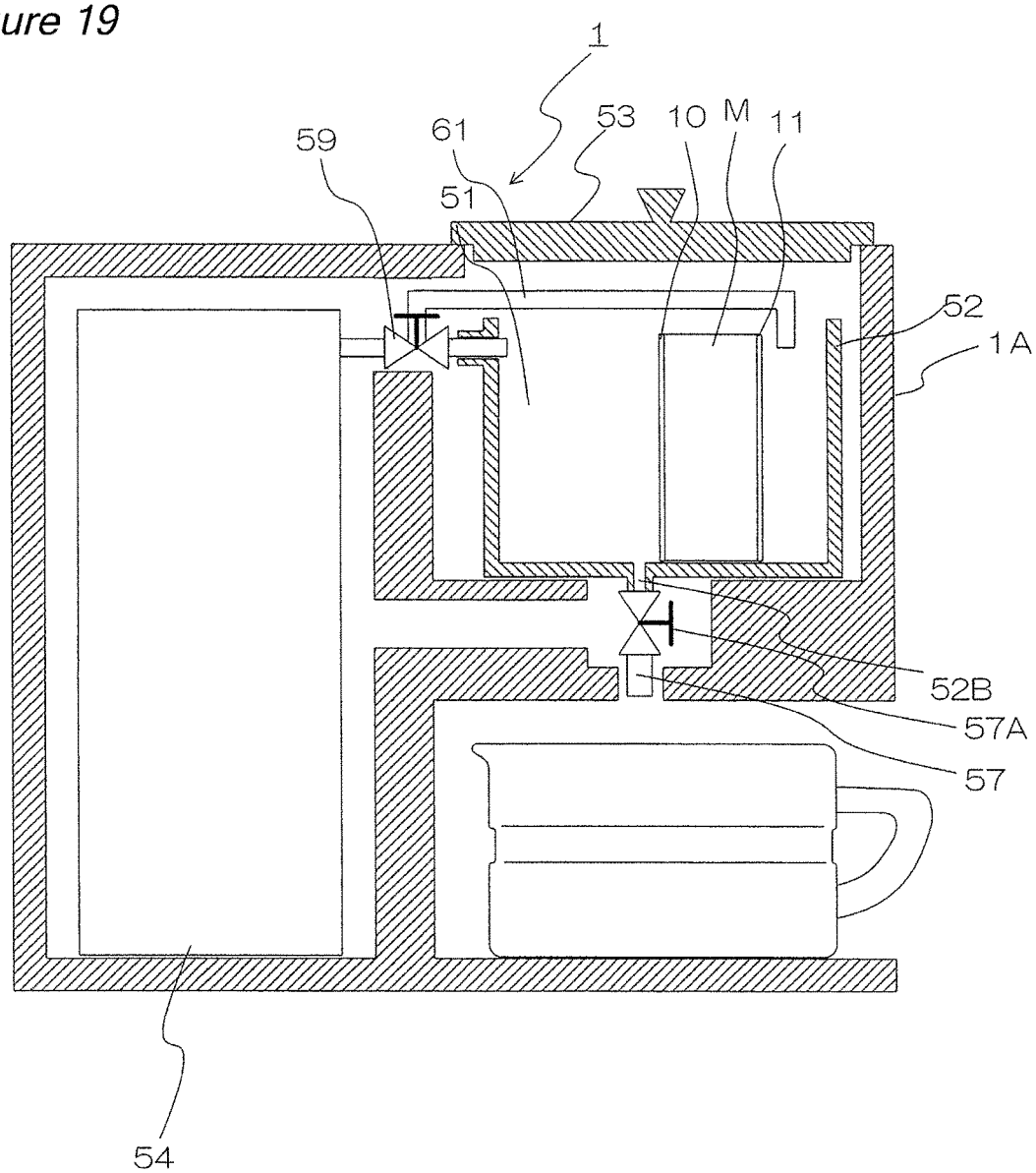
FIG. 19 is a sectional view of a beverage extraction apparatus for home use in which two supply channels of pouring device are connected at the left and right of a granule containing part.

Referring to FIG. 19, components corresponding in many respects to those in the extraction apparatus 1 shown in FIG. 18 are provided. A point of difference of the arrangement shown in FIG. 19, however, resides in that coffee granules M are in a sideway attitude and extraction chambers are formed on the left-hand and right-hand sides of the coffee granules M. Due to this difference in construction, a first supply channel 51 that is open in the extraction chamber on the left-hand side of the coffee granules M and a second supply channel 61 that is open in the extraction chamber on the right-hand side of the coffee granules M are provided. The first and second supply channels 51 and 61 are connected to an extraction solvent tank 54 through a channel switching valve 59. Pouring of the extraction solvent from the supply channels 51 and 61 can be controlled by controlling the channel switching valve 59. The open end of the second supply channel 61 is disposed in such a position as to be free in the air. However, the present invention is not limited to this. That is, the open end may be positioned in such a position as to be in contact with the inner wall surface of the granule containing part 52 to softly inject the extraction medium.

A lower opening 52B is formed in a bottom surface of the granule containing part 52. A liquid feed valve 57A is connected to the lower opening 52B. The liquid feed valve 57A is for controlling discharge of the extract liquid from the granule containing part 52. The lower opening 52B to which the liquid feed valve 57A is connected is open in the extraction chamber on the left-hand side of the coffee granules M.

The operation of the extraction apparatus 1 thus constructed will be described. The extraction solvent is first supplied from the extraction solvent tank 54 into the first supply channel 51 by the operation of the channel switching valve 59. The extraction solvent supplied into the first supply channel 51 is poured from the open end of the first supply channel 51 into the left extraction chamber. At this time, since the open end of the first supply channel 51 is provided in the vicinity of the inner wall surface of the granule containing part 52, the extraction medium is softly poured along the inner wall surface. Therefore, the coffee granules M are not disturbed by pouring of the extraction solvent from the first supply channel 51. With the pouring of the extraction medium, the extract liquid having extracted coffee ingredients also flows into the right extraction chamber.

On the other hand, the supply of the extraction solvent into the first supply channel 51 is stopped by changing the channel switching valve 59. After a lapse of a predetermined time period in this state, the channel switching valve 59 is further operated to start supplying the extraction solvent into the second supply channel 61. By this supply of the extraction solvent, the extract liquid in the right extraction chamber gradually moves into the left extraction chamber. At this time, the liquid feed valve 57A connected to the lower opening 52B is opened, thereby discharging the extract liquid existing in the granule containing part 52.

Figure 20A:
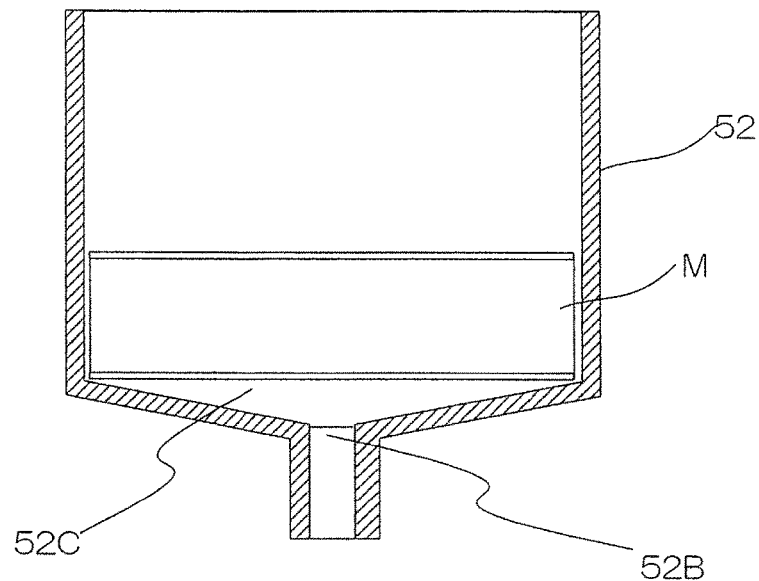
FIG. 20(A) shows a type of container in which an extraction solvent moves along a top-bottom direction.
Figure 20B:
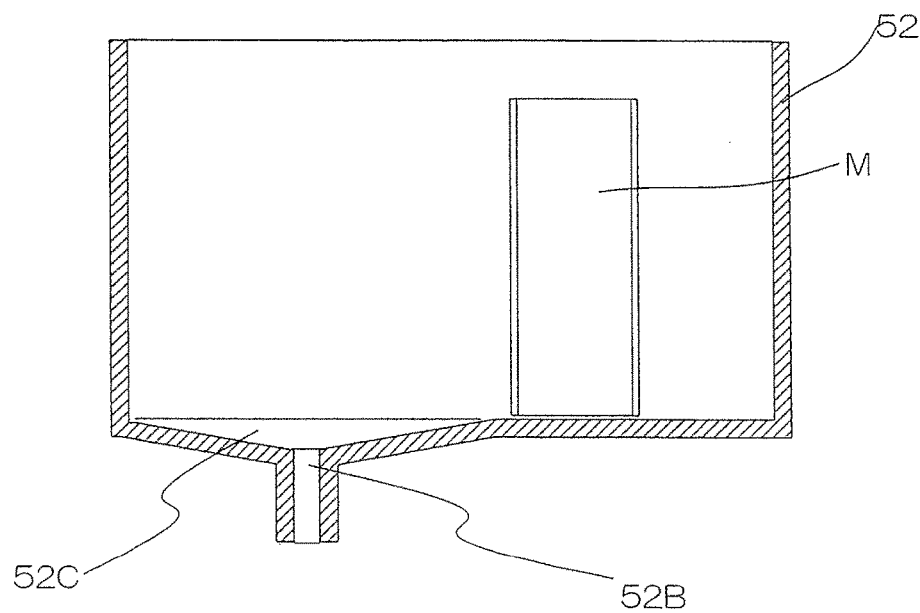
FIG. 20(B) shows a type of container in which an extraction solvent moves along a left-right direction.

FIG. 20 comprises a sectional view of a granule containing part 52 having an improved bottom surface shape. Here, FIG. 20(A) shows a granule containing part 52 to be used in the coffee maker shown in FIG. 18. As shown in FIG. 20(A), a bottom surface of the granule containing part 52 is formed as an inverted-circular-cone region 52C about a lower opening 52B, thereby enabling the extract liquid to smoothly be collected at the lower opening 52B to be discharged to the storage tank. However, the extract liquid staying in the inverted-circular-cone region 52C does not pass through the coffee granules M when discharged. This means that bitter ingredients in the extract liquid in the inverted-circular-cone region 53C are not removed. There is, therefore, a need to set the inclination of the inverted-circular-cone shape as small as possible in order to minimize that amount of the extract liquid. FIG. 20(B) shows a granule containing part 52 to be used in the coffee maker shown in FIG. 22. The basic concept about this is the same as that relating to FIG. 20(A). However, since the extraction solvent moves along the left-right direction in this case, the lower opening 52B is also shifted leftward. Correspondingly, the inverted-circular-cone region 52C is also shifted leftward.

Figure 21A:
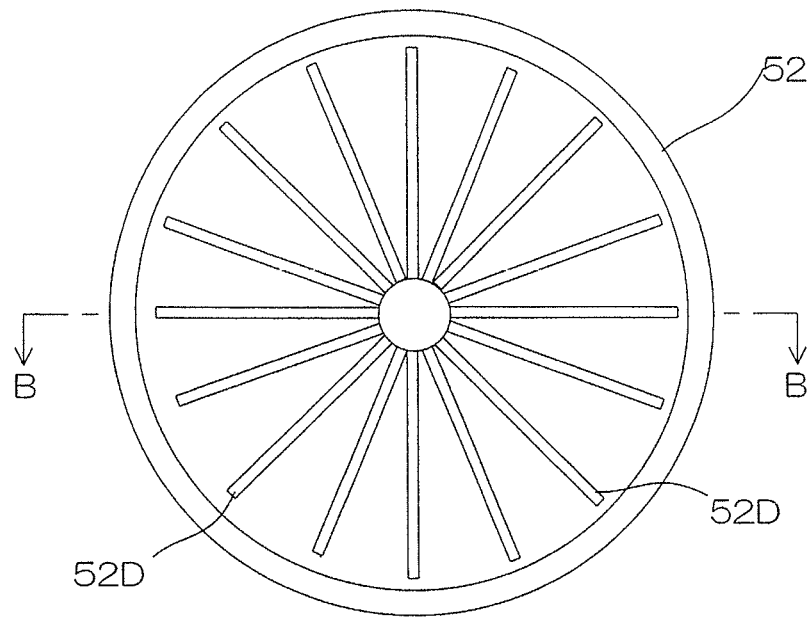
FIG. 21(A) shows a plan view.
Figure 21B:
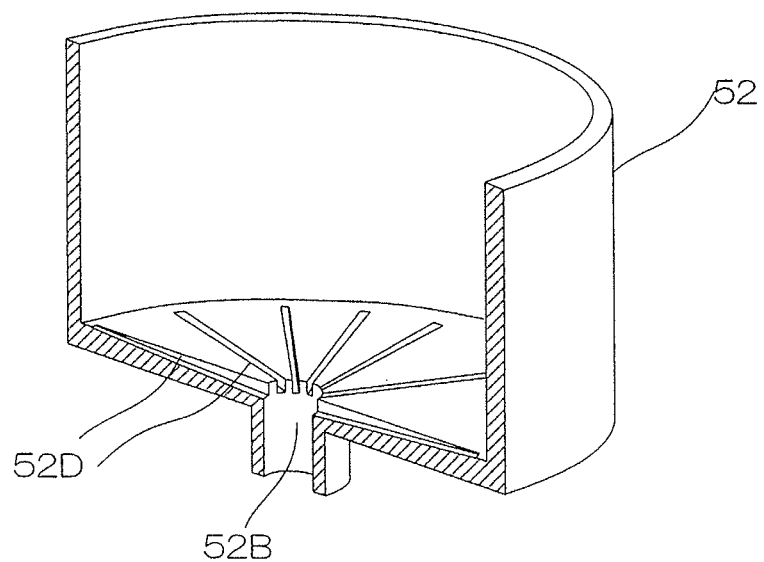
FIG. 21(B) shows a sectional perspective view taken along line B-B in FIG. 21(A).

FIG. 21 shows an example of the formation of sloped grooves 52D in a bottom surface of a granule containing part 52. While the bottom surface of the granule containing part 52 itself is not inclined, the sloped grooves 52D are formed so as to become gradually deeper with approach from a peripheral portion to a central portion of the granule containing part 52. Therefore, the extract liquid that has passed through the coffee granules M are collected at the lower opening 52B through the sloped grooves 52D. Also, since the region where the extract liquid can stay is limited to the sloped grooves 52D in comparison with the inverted-circular-cone region shown in FIG. 20, the amount of the extract liquid from which bitter ingredients are not adsorbed can be minimized. Portions 52D may be formed not as grooves but as projections to form regions between the projections as sloped grooves (channels).

Figure 22:
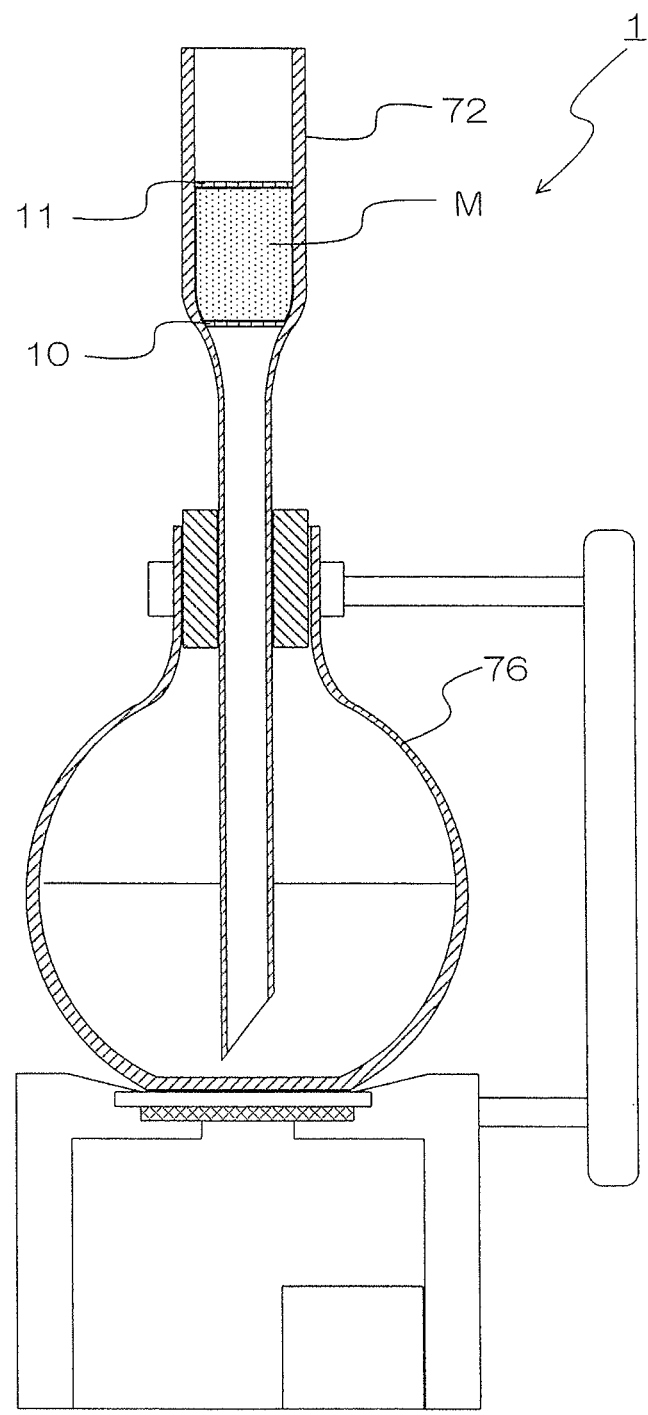
FIG. 22 is a sectional view showing a beverage extraction apparatus using a siphon structure.

FIG. 22 shows an example of a coffee extraction apparatus 1 using a siphon. The basic construction is similar to that of the conventional siphon. A point of difference from the conventional siphon, however, resides in that a restraining member 11 and a lower filter member 10 are respectively provided above and below coffee granules M in an upper container 72. This is for the purpose of improving the bitter ingredient adsorption effect by limiting the movement of coffee granules M. In this embodiment, water is stored in a lower container 76 and heated. The water is heated to become hot water, which rises into the upper container 72 because of the siphon phenomenon. At this time, the hot water passes the region of the coffee granules M from below to above the region. Heating is then stopped and the extract liquid moves from the upper container 72 into the lower container 76. When the extract liquid again passes through the coffee granules M, bitter ingredients are adsorbed to the coffee granules M.

The allowable range of the amount of water to be used is about 0.3 to 2 times the capacity of coffee granules M. Preferably, the amount of water to be used is about 0.5 to 1.5 times the granule capacity. With respect to the generally rectangular sectional shape of the coffee granules M along the axial direction, the allowable range of the ratio (H/L) of the width (L) and the height (H) of the rectangle is 0.1 to 10. However, the ratio is preferably about 2 to 6. Further, the allowable range of the rate of supply of hot water (lower container to upper container, upper container to lower container) is about 3 to 100 in terms of space velocity (SV). However, the supply rate is preferably about 7 to 34. In the case of passage of the liquid using the siphon phenomenon based on changes in internal pressure, there is a possibility of the supply rate being so high that target bitter ingredients are not sufficiently adsorbed. It also entails a drawback that resides in lowering of the temperature of the extract liquid and a drawback that resides in an extremely low extraction rate and, hence, a high cost. Therefore, the supply (second pouring) of the extraction solvent (hot water) may be manually performed from above after the entire water has moved into the upper container 72.

Figure 23:
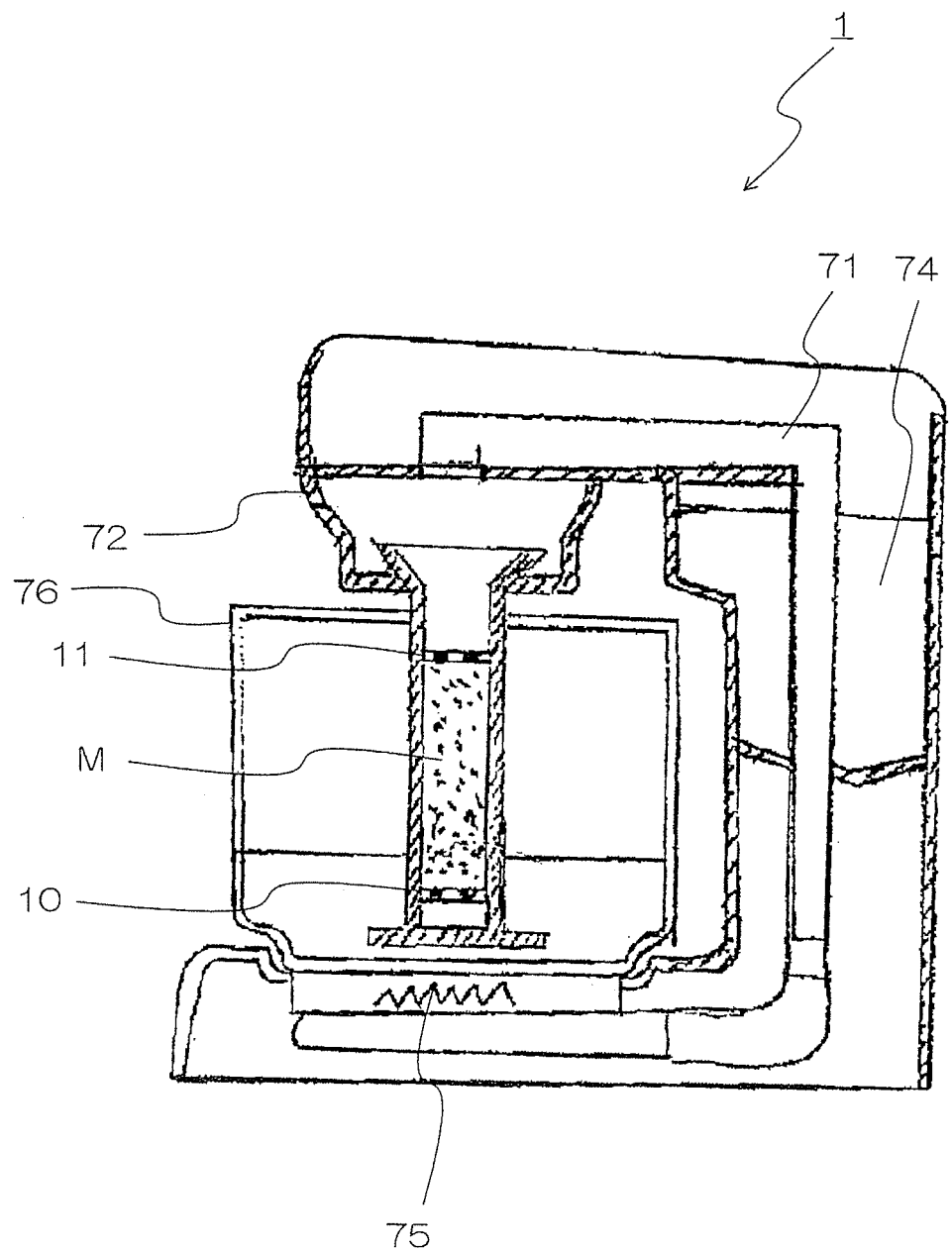
FIG. 23 is a sectional view showing a beverage extraction apparatus using a vertical coffee granule tube as a granule containing part.

FIG. 23 shows a siphon-type coffee extraction apparatus (coffee maker) 1 using cylindrical coffee granules M. This coffee extraction apparatus 1 includes the coffee granules M, an upper container 72 positioned above the coffee granules M, and a lower container 76 positioned below the coffee granules M. An extraction solvent tank (water tank) 74 is also provided in the coffee extraction apparatus 1. Water in the extraction solvent tank 74 can be supplied to the upper container 72 through a supply channel 71 by being heated. Further, heating means 75 for heating the lower container 76 is set below the lower container 76.

The operation of this coffee extraction apparatus 1 will be described. The coffee granules M are a cylindrical pipe (coffee tube) in which a coffee powder is interposed between a lower filter member 10 and a restraining member 11 so as to be unable to move. The lower container 76 is filled with water (an amount of about 0.3 to 2 times the capacity of coffee granules M) in advance. The coffee tube is thereafter set between the lower container 76 and the upper container 72. A water tank 74 is provided inside the coffee maker separately from the lower container 76.

In a state such as described above, water in the lower container 76 is heated by the heating means 75. By the siphon effect as a result of heating of water in the lower container 76, hot water rises from the lower container 76 toward the upper container 72 through the coffee granules M in the coffee tube. At this time, the supply channel 71 is in the closed state. After most of the water in the lower container 76 has moved into the upper container 72, the supply channel 71 is opened to supply heated hot water supplied from the water tank 74 to the upper container 72. The extract liquid and the supplied hot water are mixed with each other. This mixture passes through the coffee tube in the course of moving into the lower container 76. At this time, bitter ingredients are adsorbed to the honeycomb structure of the coffee granules M, thus extracting coffee of a clear taste. The next extraction process is performed by replacing the coffee tube with a new one.

Figure 24A:
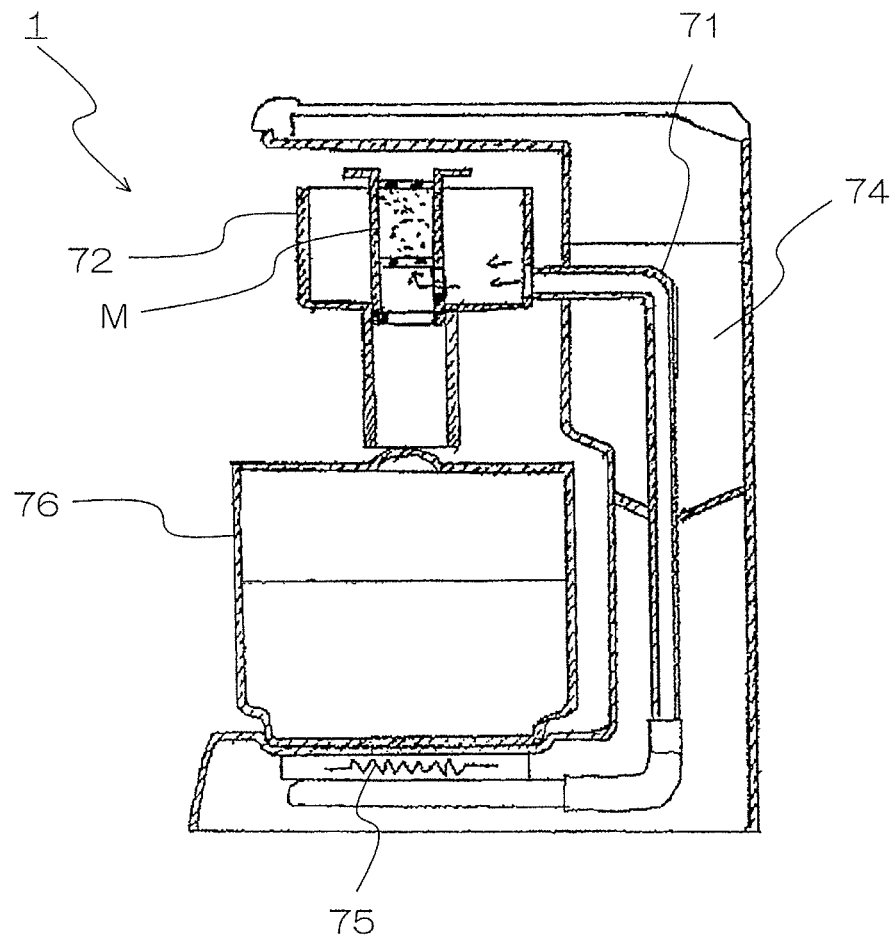
FIG. 24(A) shows a case where the coffee granule tube is at the upper end.

FIG. 24 shows a coffee maker 1 of a type such that a coffee tube is moved along the top-bottom direction. First, in a state shown in FIG. 24(A), a coffee tube (coffee granules M) is positioned in an upper position in an upper container 72. An opening is formed in a lower portion of the coffee tube. Meanwhile, a valve is provided in a bottom surface of the coffee tube and is maintained in a closed state. Under this condition, hot water is supplied from a supply channel 71. The supplied hot water is supplied into the upper container 72 and permeates into the coffee granules M via the opening of the coffee tube. Coffee is thereby extracted from the coffee granules M.

Figure 24B:
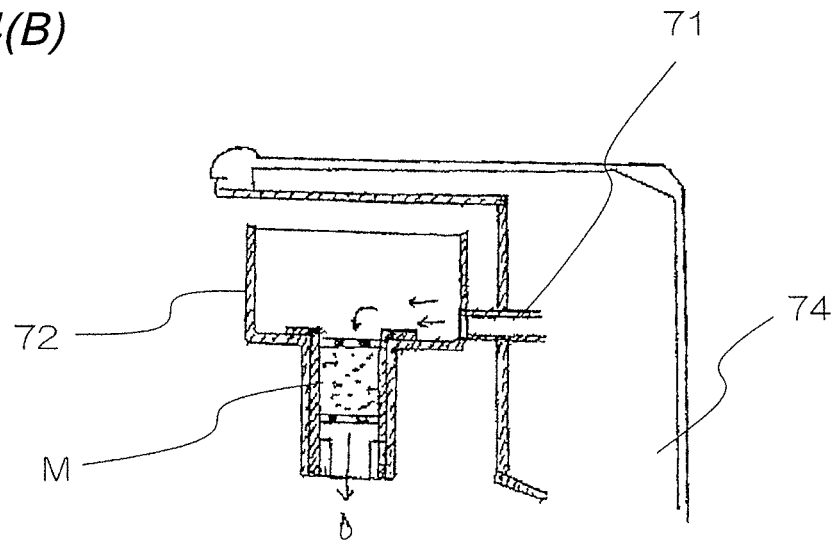
FIG. 24(B) shows a case where the coffee granule tube is at the lower end.

Next, as shown in FIG. 24(B), the coffee tube is positioned in a lower position. Simultaneously, the valve in the bottom surface of the coffee tube is opened. The extract liquid in the upper container 72 thereby moves into the lower container 76 by passing through the coffee tube. At this time, the entire extract liquid passes through the coffee granules M, so that bitter ingredients are adsorbed. Thus, an arrangement can be provided in which a coffee tube is moved along the top-bottom direction to enable the extract liquid to pass through coffee granules M.

INDUSTRIAL APPLICABILITY

The present invention can be applied to a beverage extraction apparatus for extracting a beverage, e.g., coffee.

REFERENCE SIGNS LIST

1 Beverage (coffee) extraction apparatus
2 Granule containing part
2B, 2B' Lower opening
3 Lid member
5 Supply channel
7 Liquid feed channel
M Coffee granules

The invention claimed is:

1. A beverage extraction apparatus comprising:
a granule containing part containing granules for extraction of a beverage;
a first pouring device for pouring an extraction solvent into the granule containing part from a first direction;
a collecting device for collecting an extract liquid extracted by means of the extraction solvent at a first side of layers of the granules corresponding to the first direction; and
a detachable restraining member provided in the granule containing part, the detachable restraining member in contact with or close to the first side of layers of the granules and in contact with or close to a second side of layers of the granules corresponding to a second direction opposite to the first direction,
wherein the detachable restraining member places the granules for extraction of a beverage in a substantially sealed state.

2. The beverage extraction apparatus according to claim 1, further comprising a second pouring device for pouring the extraction solvent into the granule containing part from the second direction opposite to the first direction.

3. The beverage extraction apparatus according to claim 1, wherein the granule containing part has such a shape that the granules can be contained therein in a state of being deposited in generally rectangular form as seen in a section along an axial direction.

4. The beverage extraction apparatus according to claim 1, wherein the restraining member is a mesh member.

5. The beverage extraction apparatus according to claim 1, further comprising a flow controller for controlling a flow of a liquid flowing in the granule containing part.

6. The beverage extraction apparatus according to claim 1, wherein the pouring device includes a pump for pouring the extraction solvent into the granule containing part.

7. The beverage extraction apparatus according to claim 1, wherein the collecting device includes a pump for forcibly discharging the extract liquid from the granule containing part.

8. The beverage extraction apparatus according to claim 1, wherein one lower opening is formed in a bottom portion of the granule containing part, and a supply channel in the first pouring device and a liquid feed channel in the collecting device are connected to the lower opening through a channel switching valve.

9. The beverage extraction apparatus according to claim 1, wherein two lower openings are formed in a bottom portion of the granule containing part, a supply channel in the first pouring device is connected to one of the lower openings, and a liquid feed channel in the collecting device is connected to the other of the lower openings.

10. The beverage extraction apparatus according to claim 2, wherein the second pouring device is connected to a side wall of the granule containing part at a position higher than an upper surface of the granules.

11. The beverage extraction apparatus according to claim 1, wherein a disperser for dispersing the extraction solvent over the granules is provided above the granules.

12. The beverage extraction apparatus according to claim 1, wherein the first pouring device is connected to an upper portion of the granule containing part, and at least a portion between the first pouring device and the granule containing part is formed of a sloped surface or a curved surface.

13. The beverage extraction apparatus according to claim 1, wherein the first pouring device is connected to an upper portion of the granule containing part, and a pouring end for dispersing the extraction solvent over a wide area in the granule containing part is provided in the first pouring device.

14. The beverage extraction apparatus according to claim 2, wherein the granule containing part is separated into two extraction chambers along a left-right direction by the coffee granules; a first supply channel is connected to one of the extraction chambers on the first side of the coffee granules; a second supply channel is connected to the other of the extraction chambers on the second side of the coffee granules; and the collecting device is connected to a lower opening of the one of the extraction chambers.

15. The beverage extraction apparatus according to claim 1, wherein a bottom surface of the granule containing part is formed into an inverted-circular-cone shape sloped toward the lower opening.

* * * * *